United States Patent
Phelps et al.

(10) Patent No.: US 11,830,194 B2
(45) Date of Patent: Nov. 28, 2023

(54) DATA-DRIVEN ANGULAR JITTER ESTIMATOR FOR LIDAR

(71) Applicant: Massachusetts Institute of Technology, Cambridge, MA (US)

(72) Inventors: Ethan Phelps, Arlington, MA (US); Charles Primmerman, Bedford, MA (US); Eric Statz, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 687 days.

(21) Appl. No.: 16/857,328

(22) Filed: Apr. 24, 2020

(65) Prior Publication Data
US 2023/0316528 A1    Oct. 5, 2023

Related U.S. Application Data

(60) Provisional application No. 62/867,861, filed on Jun. 27, 2019.

(51) Int. Cl.
*G06K 9/00* (2022.01)
*G06T 7/11* (2017.01)
(Continued)

(52) U.S. Cl.
CPC ............... *G06T 7/11* (2017.01); *G06F 17/18* (2013.01); *G06T 5/002* (2013.01); *G06T 5/003* (2013.01);
(Continued)

(58) Field of Classification Search
CPC . G06T 7/11; G06T 5/002; G06T 5/003; G06T 2207/10028; G06T 2207/10032; G06F 17/18
See application file for complete search history.

(56) References Cited

U.S. PATENT DOCUMENTS 6,573,982 B1   6/2003 Pruitt
9,031,809 B1   5/2015 Kumar et al.
(Continued)

OTHER PUBLICATIONS

A. Primmerman CA, Phelps EJ. Blind Compensation of Angle Jitter for Satellite-Based Ground-Imaging Ladar: FY17 Line-Supported Integrated Systems Program. MIT Lincoln Laboratory Lexington United States; 2017 (Year: 2017).*
(Continued)

*Primary Examiner* — Andrew M Moyer
*Assistant Examiner* — Owais Iqbal Memon
(74) *Attorney, Agent, or Firm* — Smith Baluch LLP

(57) ABSTRACT

Space-based ground-imaging lidar has become increasingly feasible with recent advances in compact fiber lasers and single-photon-sensitive Geiger-mode detector arrays. A challenge with such a system is imperfect pointing knowledge caused by angular jitter, exacerbated by long distances between the satellite and the ground. Unless mitigated, angular jitter blurs the 3D lidar data. Unfortunately, using mechanical isolation, advanced IMUs, star trackers, or auxiliary passive optical sensors to reduce the error in pointing knowledge increases size, weight, power, and/or cost. Here, the 2-axis jitter time series is estimated from the lidar data. Simultaneously, a single-surface model of the ground is estimated as nuisance parameters. Expectation Maximization separates signal and background detections, while maximizing the joint posterior probability density of the jitter and surface states. The resulting estimated jitter, when used in coincidence processing or image reconstruction, can reduce the blurring effect of jitter to an amount comparable to the optical diffraction limit.

20 Claims, 11 Drawing Sheets

(51) Int. Cl.
*G06T 5/00* (2006.01)
*G06F 17/18* (2006.01)

(52) U.S. Cl.
CPC .............. *G06T 2207/10028* (2013.01); *G06T 2207/10032* (2013.01)

(56) References Cited

U.S. PATENT DOCUMENTS

| | | | |
|---|---|---|---|
| 2009/0219395 | A1 | 9/2009 | Baker et al. |
| 2010/0045674 | A1* | 2/2010 | Clifton ...................... G06T 5/20 345/424 |
| 2013/0105671 | A1 | 5/2013 | Cook et al. |
| 2015/0371431 | A1* | 12/2015 | Korb ......................... G06T 7/73 382/113 |
| 2016/0356890 | A1* | 12/2016 | Fried ..................... G01S 7/4863 |
| 2019/0253701 | A1 | 8/2019 | Himel et al. |

OTHER PUBLICATIONS

National Technical Reports Library search result for NPL item U (Year: 2017).*
Bayard, David S. "State-space approach to computing spacecraft pointing jitter." Journal of guidance, control, and dynamics 27.3 (2004): 426-433.*
Bayard, David S. "State-space approach to computing spacecraft pointing jitter." Journal of guidance, control, and dynamics 27.3 (2004).*
Albota et al., "Three-dimensional imaging laser radar with a photon-counting avalanche photodiode array and microchip laser." Applied Optics 41.36 (2002): 7671-7678.
Bayard, "State-space approach to computing spacecraft pointing jitter." Journal of Guidance, Control, and Dynamics 27.3 (2004): 426-433.
Dellaert, The expectation maximization algorithm. Georgia Institute of Technology, 2002. 7 pages.
Dempster et al., "Maximum likelihood from incomplete data via the EM algorithm." Journal of the Royal Statistical Society: Series B (Methodological) 39.1 (1977): 1-22.
Dow, "Explicit inverses of Toeplitz and associated matrices." ANZIAM Journal 44 (2002): 185-215.
El-Shehawey, "On inverses of tridiagonal matrices arising from Markov chain-random walk I." SIAM Journal on Matrix Analysis and Applications 30.2 (2008): 497-508.
Fiete, "Image quality and [lambda] FN/p for remote sensing systems." Optical Engineering 38.7 (1999): 1229-1241.
Gates, "Spectral distribution of solar radiation at the earth's surface." Science 151.3710 (1966): 523-529.
Kavcic et al., "Matrices with banded inverses: Inversion algorithms and factorization of Gauss-Markov processes." IEEE Transactions on Information Theory 46.4 (2000): 1495-1509.
Kirmani et al., "First-photon imaging." Science 343.6166 (2014): 58-61.
Levin et al., "Efficient marginal likelihood optimization in blind deconvolution." CVPR 2011. IEEE, 2011. 8 pages.
Meurant, "A review on the inverse of symmetric tridiagonal and block tridiagonal matrices." SIAM Journal on Matrix Analysis and Applications 13.3 (1992): 707-728.
Murthy et al., "SkySat-1: very high-resolution imagery from a small satellite." Sensors, Systems, and Next-Generation Satellites XVIII. vol. 9241. International Society for Optics and Photonics, 2014. 13 pages.
Phelps et al., "Blind Compensation of Angle Jitter for Satellite-Based Ground-Imaging Lidar." IEEE Transactions on Geoscience and Remote Sensing (2019). 14 pages.
International Search Report and Written Opinion in International Patent Application No. PCT/US2020/029691 dated Oct. 19, 2020, 15 pages.
Phelps et al., "Blind Compensation of Angle Jitter for Satellite-Based Ground-Imaging Lidar." IEEE Transactions on Geoscience and Remote Sensing 58.2 (2019): 1436-1449.

* cited by examiner

DATA-DRIVEN ANGULAR JITTER ESTIMATOR FOR LIDAR

CROSS-REFERENCE TO RELATED APPLICATION(S)

This application claims the priority benefit, under 35 U.S.C. 119(e), of U.S. Application No. 62/867,861, filed on Jun. 27, 2019, which is incorporated herein by reference in its entirety.

GOVERNMENT SUPPORT

This invention was made with government support under FA8702-15-D-0001 awarded by the U.S. Air Force. The government has certain rights in the invention.

BACKGROUND

Airborne three-dimensional (3D) imaging lidars have been used for mapping, detecting objects under foliage and camouflage, route planning, change detection, determining vehicle accessibility, identifying landing zones, and so on. Extending 3D imaging to space would provide similar capabilities for territory that is harder to access with aircraft. A problem with space systems, of course, is that they can be very large and costly.

In addition, a technical challenge for any 3D-lidar mapping system is integrating signal returns in the presence of angular pointing jitter. This challenge has been successfully met in airborne lidar systems, but these systems had a relatively easier jitter problem because the ground sample distance (GSD) is larger than the ground resolution distance (GRD) and because they have only a few-kilometer lever arm for the jitter. (The GSD is the distance on the ground corresponding to the distance between the centers of adjacent pixels in the (digital) image. The GRD is the size of the smallest object that can be resolved in the image.)

In addition, these airborne systems can use precise, large-SWaP pointing mirrors to provide precise pointing knowledge. A lidar mounted on a small satellite has a more difficult jitter problem. The GSD is less then or about equal to the GRD, and there are hundreds of kilometers of lever arm for the jitter. In addition, for a small-sat lidar it is desirable to eliminate large, expensive precise pointing mirrors.

SUMMARY

For imaging lidars, time-varying error in pointing knowledge degrades the cross-range resolution of the output data, such as point clouds or height maps. For large standoff ranges, especially in the case of satellite-based lidar, random angular jitter can cause errors in pointing knowledge that blur the data much more significantly than both optical diffraction and pixel quantization.

One problem addressed here is how to mitigate the blurring effect that random errors in pointing knowledge—due to jitter—have on 3D lidar data products. Prior approaches to this problem include:

1. Active image correlation—One prior approach to mitigating jitter is to determine the jitter by cross-correlating height images formed from the lidar data. A problem with this approach is that each image must be integrated for long enough to give a valid height estimate for a large fraction of pixels. This is exacerbated by background noise and by low detection rates per pixel per pulse. The long integration time causes two problems: First, it reduces the frequency at which jitter estimates are produced. Second, the images used for cross-correlation are already blurred by the jitter within the integration time, which degrades the quality of the jitter estimates.
2. Auxiliary sensor passive image correlation—This alternative approach involves using an auxiliary passive imaging system and using cross-correlation or feature-correlation (e.g. scale-invariant feature transform (SIFT)) across images to estimate jitter. This requires an extra imaging sensor and is signal-limited to low update rates, leading to the same problems as with active image correlation. Passive imaging is also limited to daytime or else depends on the existence of light sources in the observed scene.
3. Higher performance inertial measurement unit (IMU)/inertial navigation system (INS) and star tracker—This approach involves using higher performance instrumentation to measure the precise pointing at a high update rate. This is expensive and increases size and weight.
4. Higher performance mechanical isolation—This approach is different than the others in that it attempts to eliminate the angular jitter, rather than measure it. A very careful mechanical design isolates the optical components of the lidar's receive path from the sources of jitter. Mechanical isolation can be challenging and may greatly increase size, mass, and cost. Additionally, if the isolation failed, compensation would be needed anyway.

The blind jitter estimation approach described here avoids the size, weight, and power (SWaP) and cost disadvantages of the approaches above by precisely modeling the physics of the lidar measurements and using a Bayesian approach to estimate the jitter. Successful estimation of the jitter effectively eliminates the pointing error and allows other processing (e.g. coincidence processing) to use the estimated jitter time series to correct the pointing, and otherwise ignore jitter, while reaping the benefits of greatly improved angular resolution.

Blind jitter estimation offers a number of advantages over other jitter mitigation techniques. To start, blind jitter estimation operates based on the lidar data itself, without requiring data from other sensors. It uses Bayesian estimation to fuse the information in the measurements with prior information that represents the assumed power spectrum of the jitter and the assumed spatial frequency spectrum of the scene.

In addition, blind jitter estimation accurately models the temporal and angular effects of the relevant state variables and parameters on each measured photon detection. It separates (probabilistically) signal detections and noise detections in a statistically robust and accurate way. It estimates the jitter at a very high sample frequency, e.g., on the order of individual pulses. This allows even very high frequency components (e.g., 100 kHz) of the jitter to be compensated.

Blind jitter estimation can be carried by acquiring, with a lidar, lidar data representing a surface. The lidar data can be acquired from a satellite or other platform with a GSD equal to or less than a GRD, such as a high-flying aircraft, and stored in the platform's on-board memory. More specifically, the lidar can illuminate the surface with pulses of light from the satellite and receive returns from the surface with a receiver on the satellite.

The following steps can be carried out in real-time or near real-time with a processor on the platform or in post-processing with a processor located elsewhere, such as a satellite ground station. These steps include initializing a state vector representing (i) the jitter and (ii) a height of the surface based on the lidar data, where the jitter can be a two-dimensional jitter represented by independent Gaussian random vectors. The state vector can be initialized by forming a height image based on the lidar data without jitter compensation and fitting a weighted sum of kernel functions to the height image.

The processor also initializes a component probability vector representing a probability that any data point in the lidar data is signal or noise. Once the state and component probability vectors have been initialized, the processor iteratively (i) estimates a membership vector of each data point in the lidar data based on the state vector and the component probability vector and (ii) perturbs the jitter and the height in the state vector based on the membership vector of each data point in the lidar data to reduce a cost function. The membership vector of a given data point in the lidar data can represent probabilities that the given data point of the lidar data is signal or noise. Reducing the cost function may involve performing a gradient descent on the cost function weighted by the membership vector.

The processor continues iterating until reaching a stopping criterion, such as a change in the state vector, a change in the probability vector, a change in total likelihood of the lidar data, a number of iterations, or an elapsed processing time. After reaching the stopping criterion, the processor compensates the lidar data based on the jitter in the state vector. For example, the processor may compensate the lidar data based on the jitter by forming a diffraction-limited image from the lidar data.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows operation of a space-based, ground-imaging 3D lidar mounted a satellite. The satellite-mounted lidar does a raster scan over a region of interest on the ground, uniformly illuminating a 70 m×70 m area with each pulse, which projects onto a 128×128 array of Geiger-mode detector pixels. The dwell time for the field of view is on the order of 10 ms.

FIG. 1B shows a schematic of the optical payload of the lidar system in FIG. 1A.

FIG. 2 shows modeled power spectral density (PSD) for residual angular jitter (solid line), representing a first-order Gauss-Markov process, and reference PSD (dashed line). The reference PSD represents random walk, which is a common behavior in pointing systems. The modeled PSD has a knee at 20 Hz and fits the reference asymptotically at high frequencies.

FIG. 3 shows a cropped view of truth height image (grayscale) with pixel grid (green) and jitter path (blue) overlaid. Over the dwell time, the center of the pixel grid follows the jitter path, leading to blurred imagery if this effect is not compensated. The jitter spans a large number of pixels and shows the scale of the blurring effect.

Figure 6:
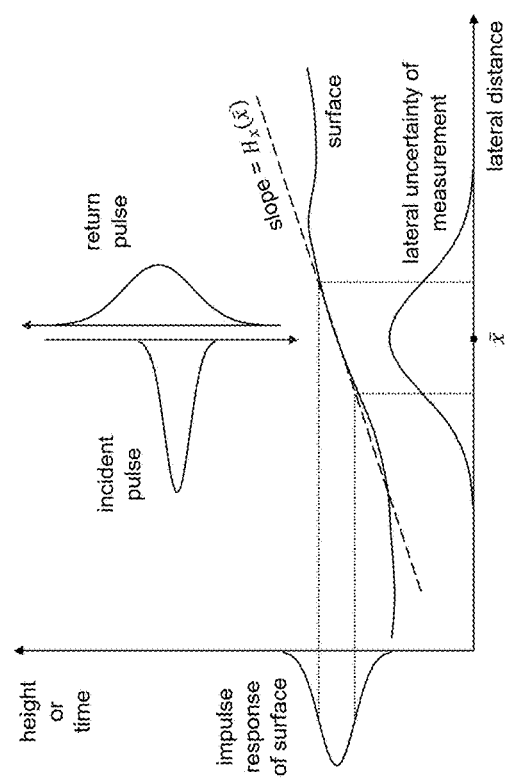

FIG. 6 is a plot illustrating temporal pulse broadening caused by lateral uncertainty of measurement across the single surface model. Lateral uncertainty is caused by the finite size of the pixel and the point spread function of the receiver. The combination is approximated as a Gaussian, which is compressed or stretched by the slope of the surface, giving the impulse response of the surface. This Gaussian convolves with the incident pulse to produce the return pulse.

Figure 7:
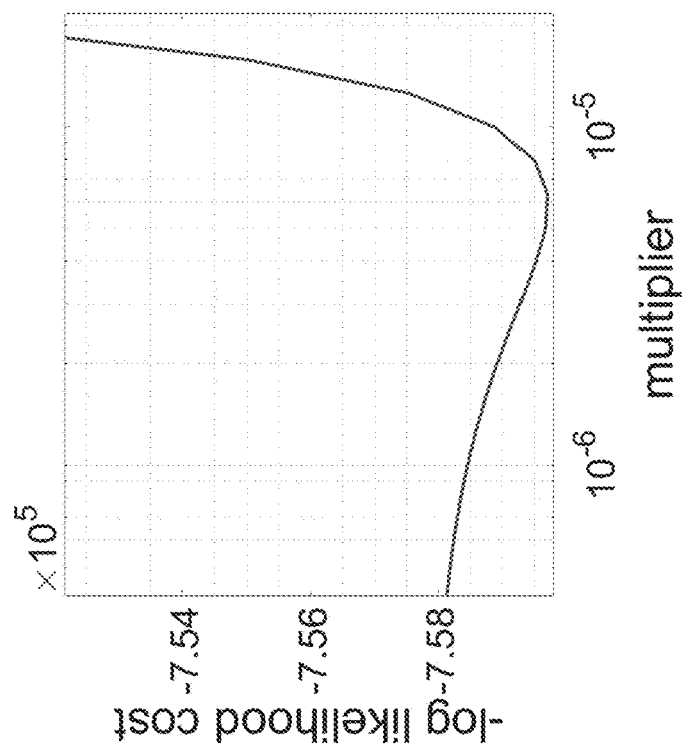

FIG. 7 shows a typical example of M-step cost function vs. step size multiplier. The cost function is evaluated for an initial large step size multiplier. If this does not reduce the cost, then a sequence of decreasing logarithmically-spaced step size multipliers is tried.

Figure 8A:
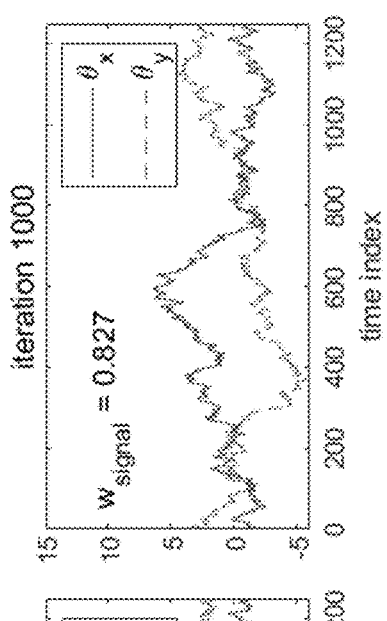
Figure 8B:
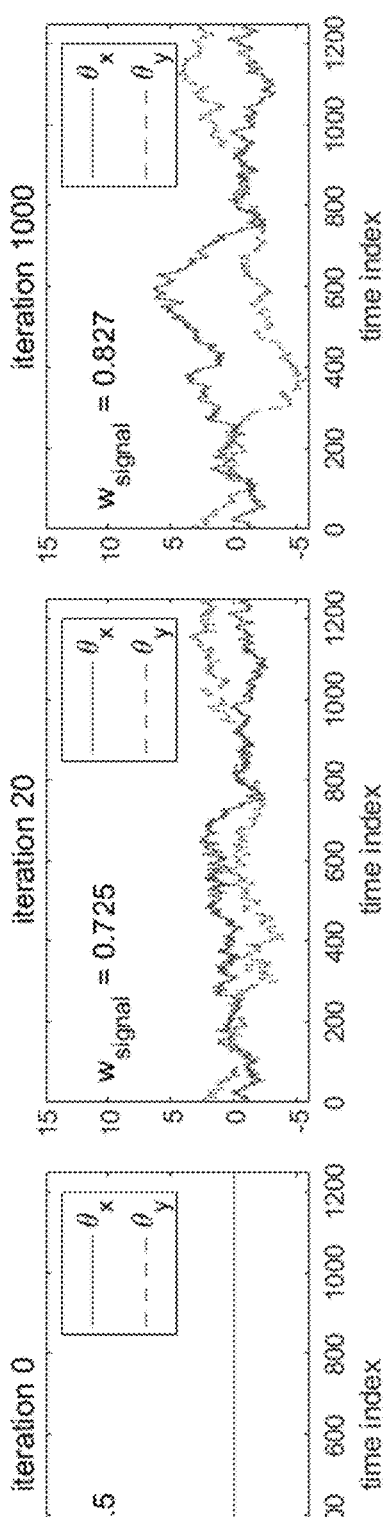
Figure 8C:
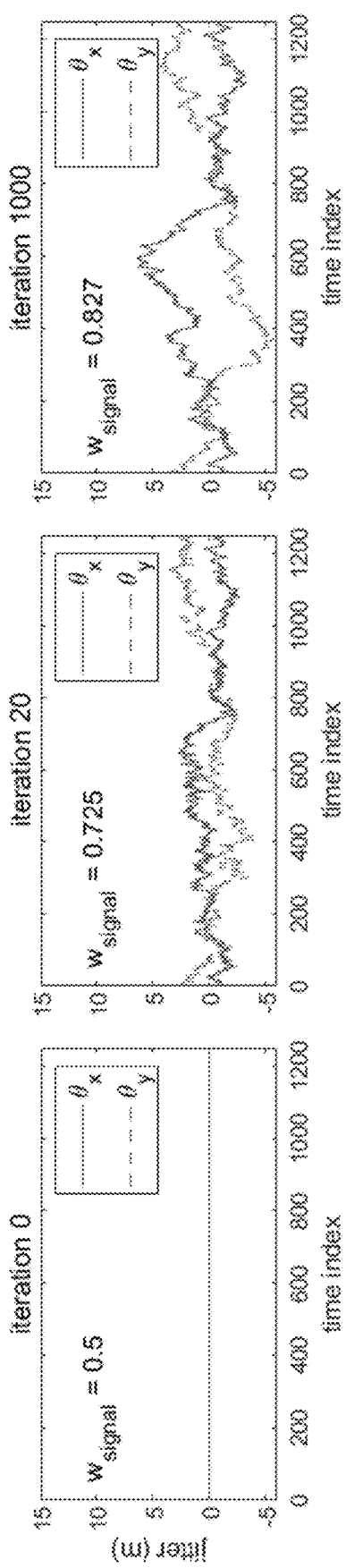
Figure 8D:
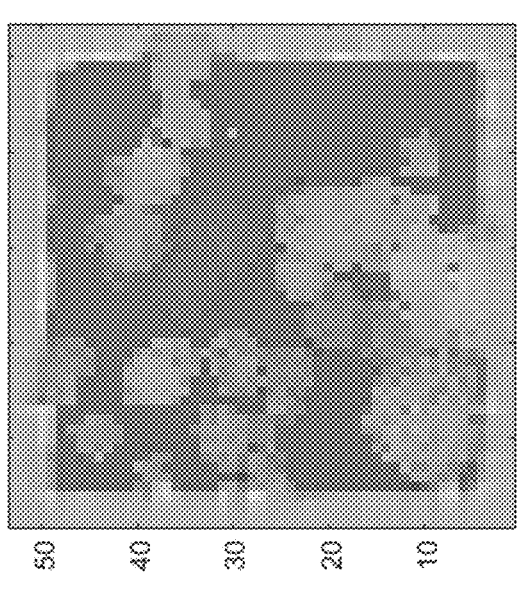
Figure 8E:
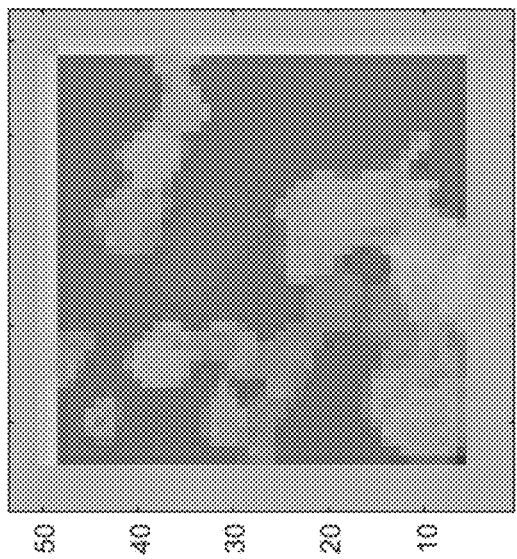
Figure 8F:
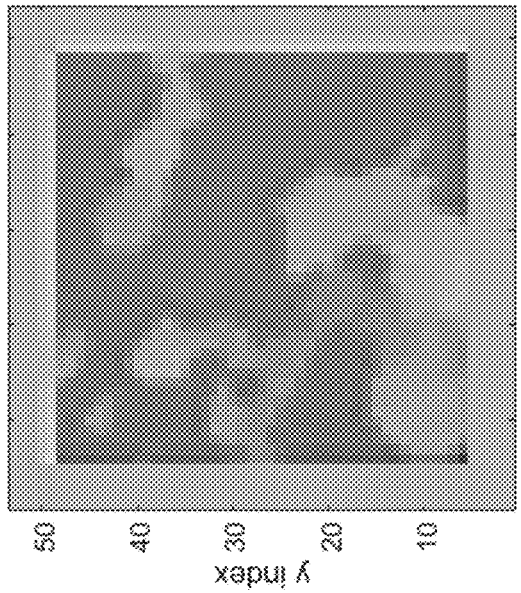

FIGS. 8A-8F show elements of the estimated state vector corresponding to x and y jitter, shown as time series (FIGS. 8A-8C), and height, shown as images (FIGS. 8D-8F). Estimates are shown at initialization (FIGS. 8A and 8D); iteration 20, representing partial convergence (FIGS. 8B and 8E); and iteration 1000, representing full convergence (FIGS. 8C and 8F). FIGS. 8A-8C also show the signal-component probability, W signal, which increases as the process "finds" more of the signal. Despite the coarse sampling of the height states and their indirect relationship to height, the images in FIGS. 8D-8F show scene objects becoming sharper and more resolved as the jitter and height states evolve simultaneously.

Figure 9A:
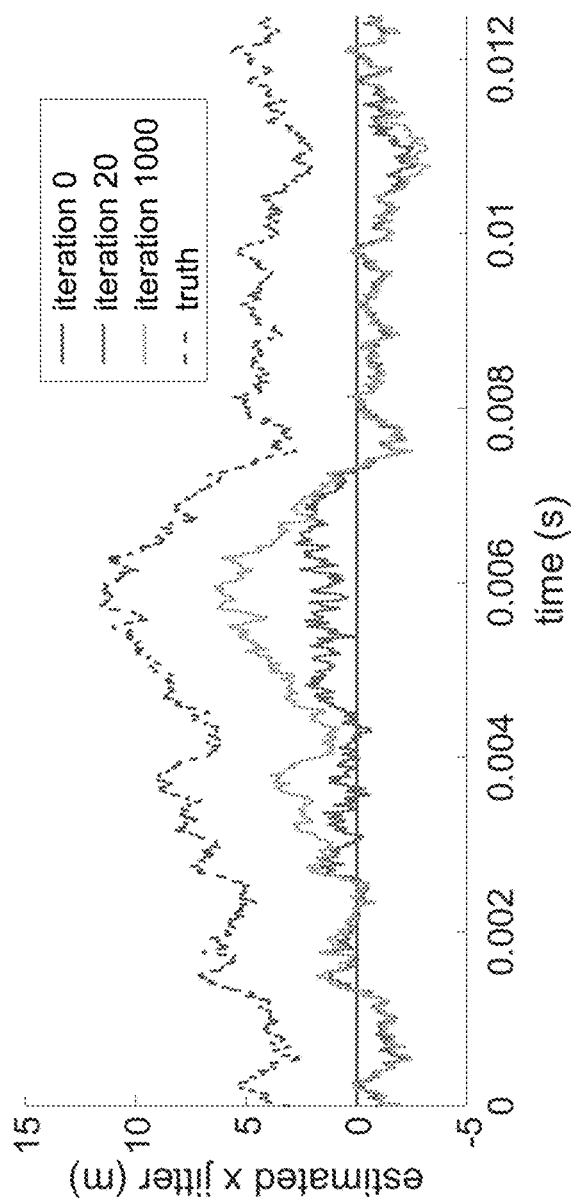

FIG. 9A shows estimated x jitter vs. time, at initialization (blue), partial convergence (red), and full convergence (yellow), compared against truth (purple).

Figure 9B:
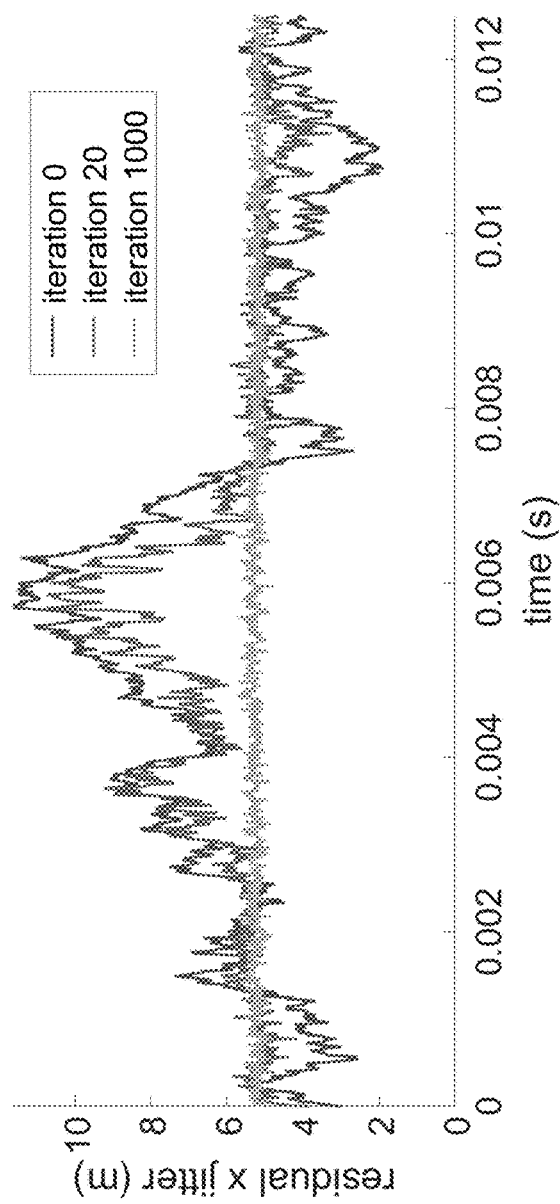

FIG. 9B shows residual x jitter (truth minus estimate) at the three levels of convergence shown in FIG. 9A. At full convergence, the residual x jitter is reduced to an unobservable constant bias plus a small amount of mostly white noise.

Figure 10B:
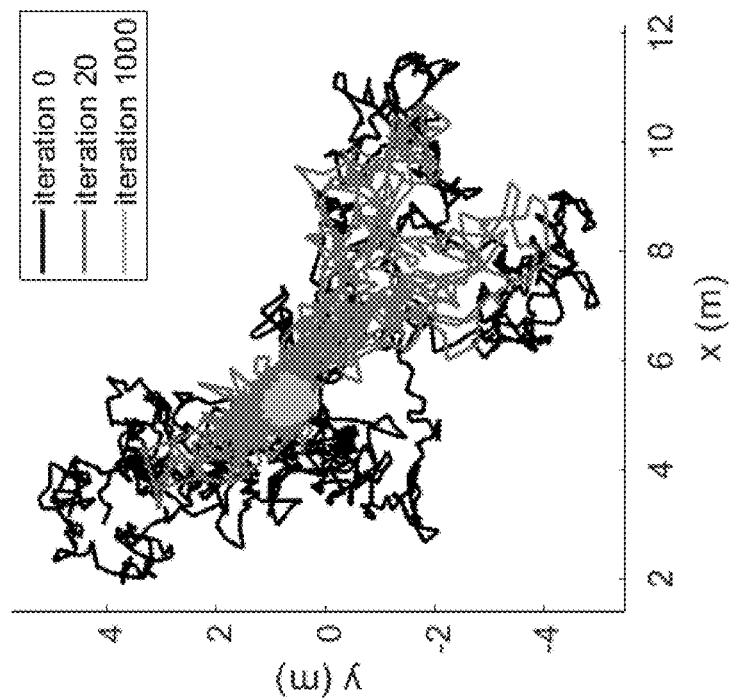
Figure 10A:
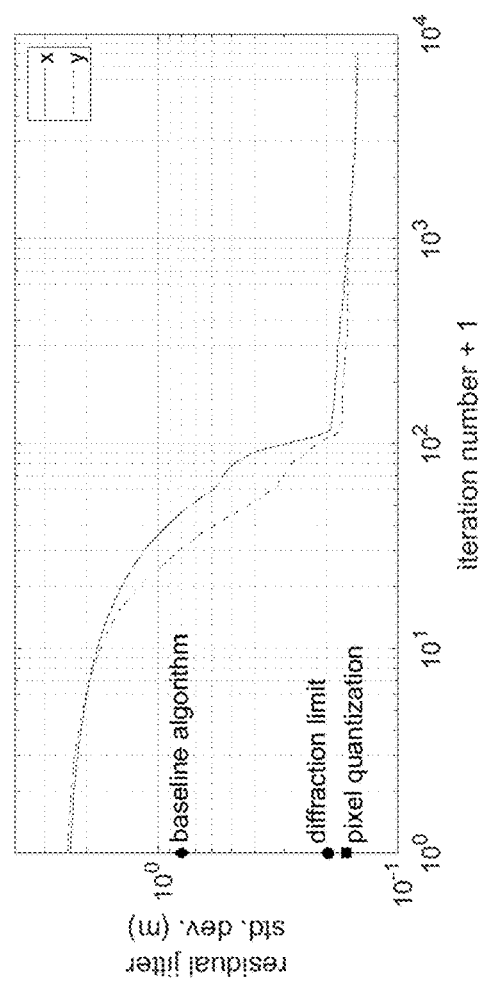

FIG. 10A is a plot of standard deviation of residual jitter in x (blue) and y (red dashed) vs. iteration number. This metric neatly quantifies the blurring effect of residual jitter. At iteration 120, the standard deviation has been reduced by over an order of magnitude, to a similar size as the diffraction limit and the pixel quantization.

FIG. 10B is a plot of residual jitter path at varying levels of convergence (initialization, partial, full).

Figure 11C:
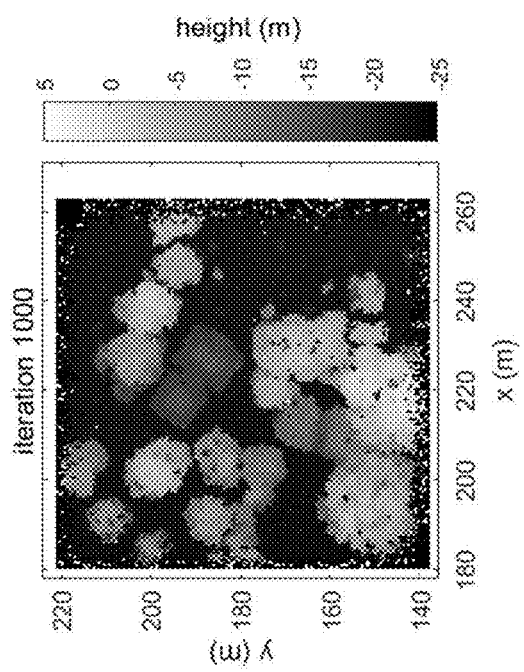
Figure 11B:
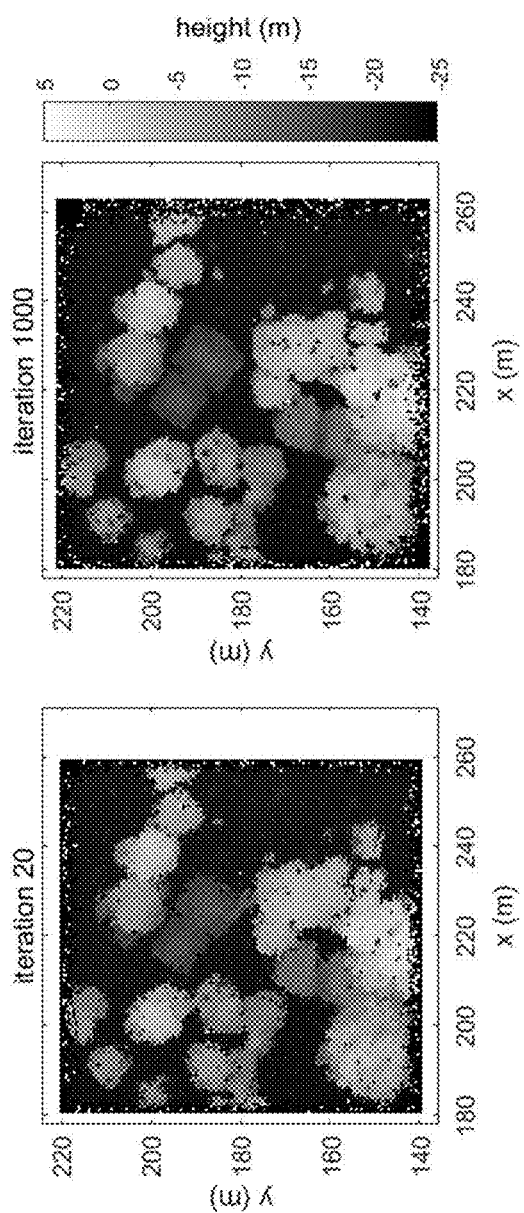
Figure 11A:
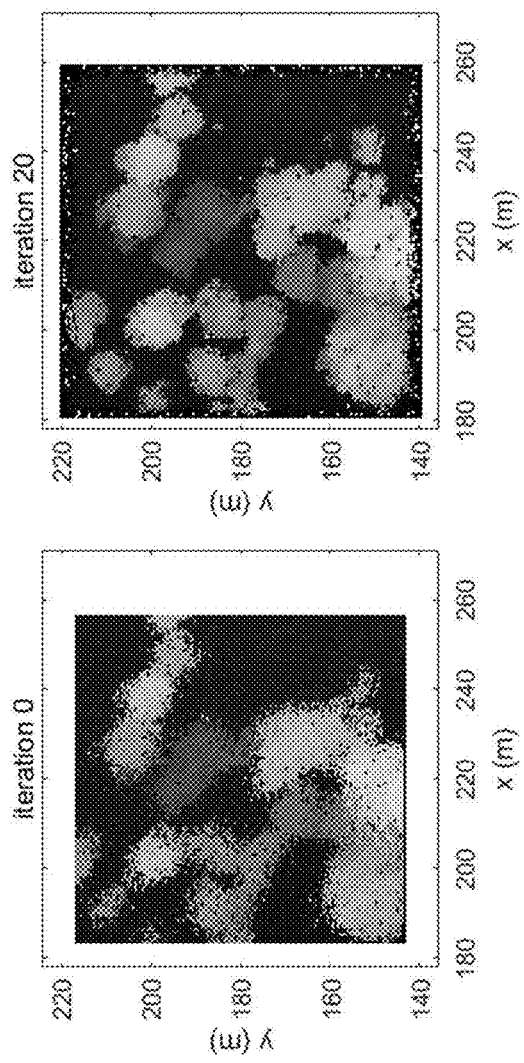

FIGS. 11A-11C show jitter-compensated height images at varying levels of convergence (initialization, partial, full), with overlay of residual jitter (blue).

Figure 11F:
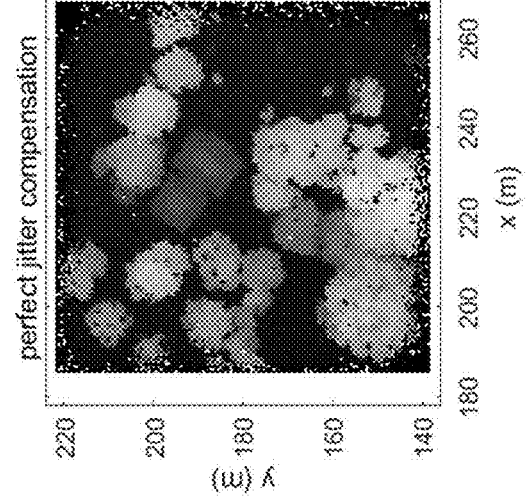
Figure 11E:
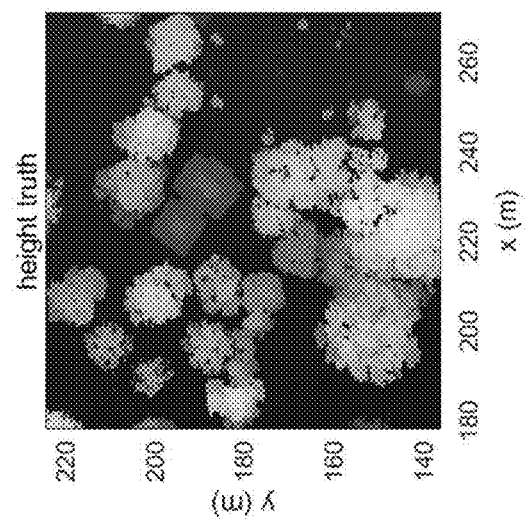
Figure 11D:
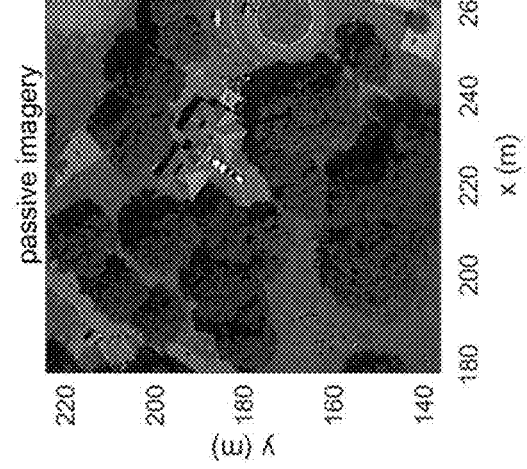

FIG. 11D shows Google Earth imagery of the scene in FIGS. 11A-11C.

FIG. 11E shows a high-resolution height map used as truth in simulating measurements which were input to the jitter compensation process illustrated in FIGS. 11A-11C.

FIG. 11F shows a jitter-compensated height image using perfect knowledge of the true jitter. The estimated-jitter-compensated image in FIG. 11C compares favorably with the true-jitter-compensated image in FIG. 11F.

DETAILED DESCRIPTION

Blind jitter estimation can be used to identify and mitigate time-varying error in pointing knowledge due to jitter in imaging lidar data. It can simultaneously estimate the scene and the jitter. The raw imaging lidar data is usually sparse and mixed with background noise; for example, the signal may constitute about 0.005 counts/pixel/pulse and the noise may reach 0.01-0.1 counts/pixel/pulse.

To work with this sparse, noisy signal, blind jitter estimation exploits the commonality of jitter across the scene, the commonality of the scene over time, the statistics of jitter over time, and the statistics of the scene spatial frequencies. It uses the raw lidar imaging data, basic pointing information, and lidar parameters to generate an initial model representing the ground surface height as a function of transverse dimensions x and y. (The real scene may have multiple heights, e.g., in the case of foliage.) Because the lidar scan angle is quite small (e.g., less than 1 degree), the angularly scanning lidar can be approximated as a lidar "head"—the receiver in the lidar system—that moves transversely across the model of the ground surface while looking straight down (e.g., from space) at the ground surface. The jitter is the difference between where the lidar receiver is reported to be looking (according to the instrumentation) and where it is actually looking. Put differently, the jitter represents error in the knowledge of where the lidar is pointing.

In blind jitter estimation, a state vector represents the two-dimensional jitter and the height of the surface imaged by the lidar. The height of the surface is represented by a smooth, continuous function that can be parameterized by an array of height coefficients. (If the surface is discontinuous, it can be sampled more finely to yield smooth sections of the surface; in any event, the function is only an approximation and doesn't have to be completely accurate.) The continuous x and y jitter time series are each represented by a vector of coefficients. The discrete coefficients determine the continuous time series through a process such as linear interpolation. Blind jitter estimation solves for estimates of the points representing the x and y jitter time series.

Expectation maximization operates on the state vector by increasing or maximizing the joint posterior probability density of the jitter and height surface states while separating signal and background detections in the lidar data. The jitter is initialized to zero (i.e., no jitter), and the height of the surface is initialized from the raw lidar data assuming no jitter. For instance, if the lidar data is a point cloud representing detections by the lidar receiver, then the initial height estimate may be made by selecting the range (z) bin with the most detections per lateral coordinate pair (x-y pair) from a 3D histogram of detections in 3D Cartesian space.

Once the state and membership vectors have been initialized, EM involves iterating between two steps to solve for the jitter and the model of the height of the ground imaged by the lidar. In the first step, also called the Expectation step or E step, the initial set of jitter and height values are used to estimate a two-element membership vector for each detection in the lidar point cloud. The two elements of the membership vector represent the probabilities that a given detection is signal or noise. In the second step, also called the Maximization step or M step, the membership vectors are averaged across all detections to get updated signal and noise component probabilities. The signal memberships of the detections are used as weights in a weighted-sum cost function that is reduced or minimized by varying the jitter and height elements in the state vector using gradient descent. The resulting gradient is the sum of contributions weighted by the signal memberships and is the same size as the state vector. The E and M steps are repeated until the state and membership vectors converge or another stopping criterion is reached. The results of EM are better estimates of the 2D jitter and surface height. The jitter estimates can be used in coincidence processing or image reconstruction to reduce the blurring effect of jitter to an amount comparable to the optical diffraction limit.

Blind jitter estimation performs much better than no jitter compensation and frame-to-frame image registration. For example, in a scenario in which the standard deviation of the combined two-axis jitter was about six times the pixel size, and pixel size matched the Rayleigh diffraction limit (1.22λ/D), blind jitter estimation reduced the residual angular jitter by over a factor of 10 in amplitude (100 in power). Blind jitter estimation performed about 4 times better in amplitude (16 times better in power) than frame-to-frame registration. Jitter-compensated images are much clearer and much more valuable for object recognition, whether performed by humans or computers, than uncompensated images.

Space-Based, Ground-Imaging Lidar

Figure 1A:
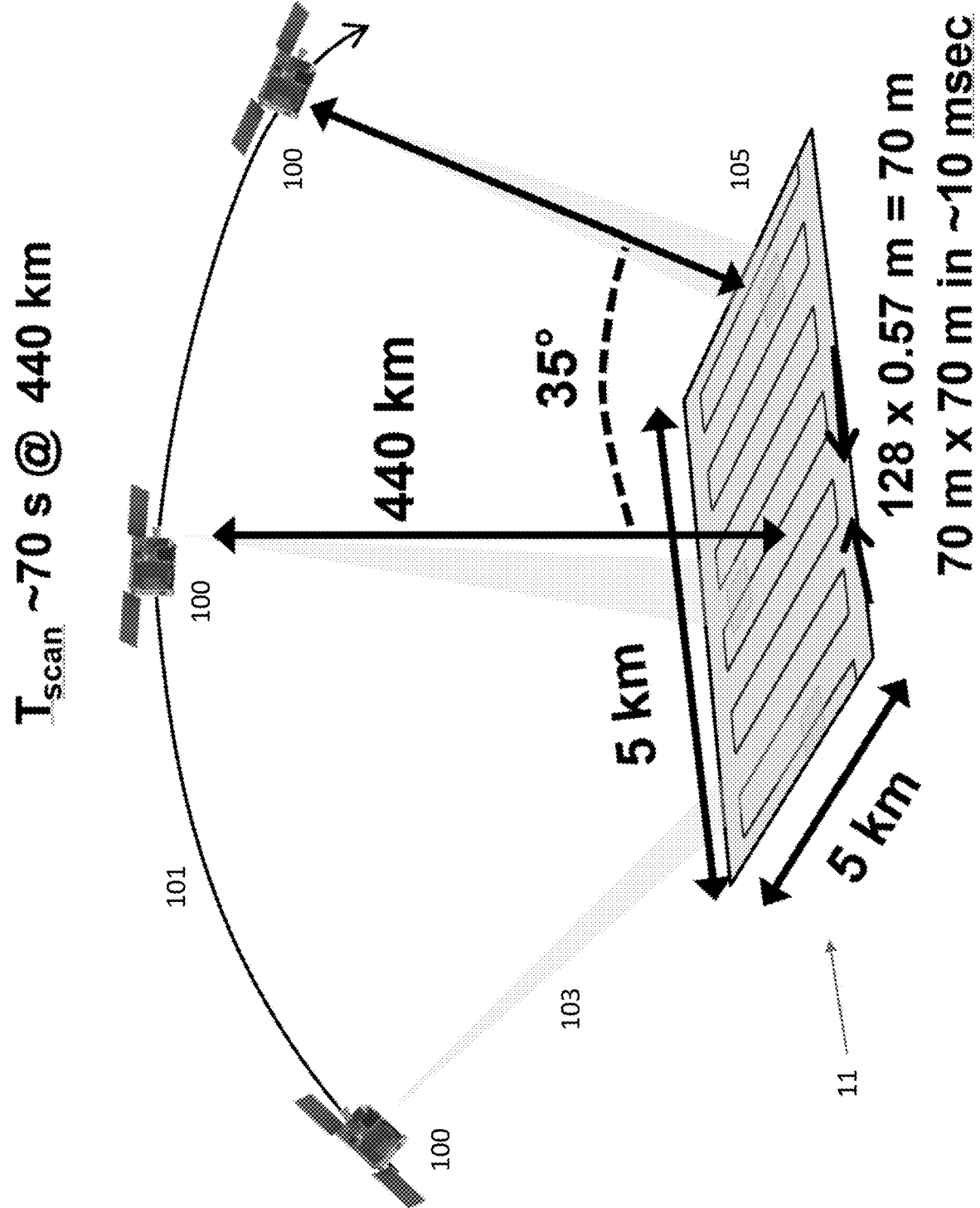

FIG. 1A shows a space-based, ground-imaging lidar on a satellite 100 that follows a trajectory 101. The lidar includes a short-pulse (e.g., about 1 ns duration) high-repetition-rate laser that illuminates a small patch on the ground 11 (of order 70 m×70 m) with short pulses of laser light 103. The backscattered light is imaged on a moderate-sized (e.g., 128×128 pixel or 256×256 pixel) avalanche photodiode (APD) array. The APD pixels detect individual photons and make precise timing measurements, from which surface heights can be calculated. To generate a surface-height map over a large area (e.g., of order 10 km$^2$) the laser beam and APD-array field of view are rapidly scanned across the ground 11, for example, in a raster pattern 105 as shown in FIG. 1A.

Figure 1B:
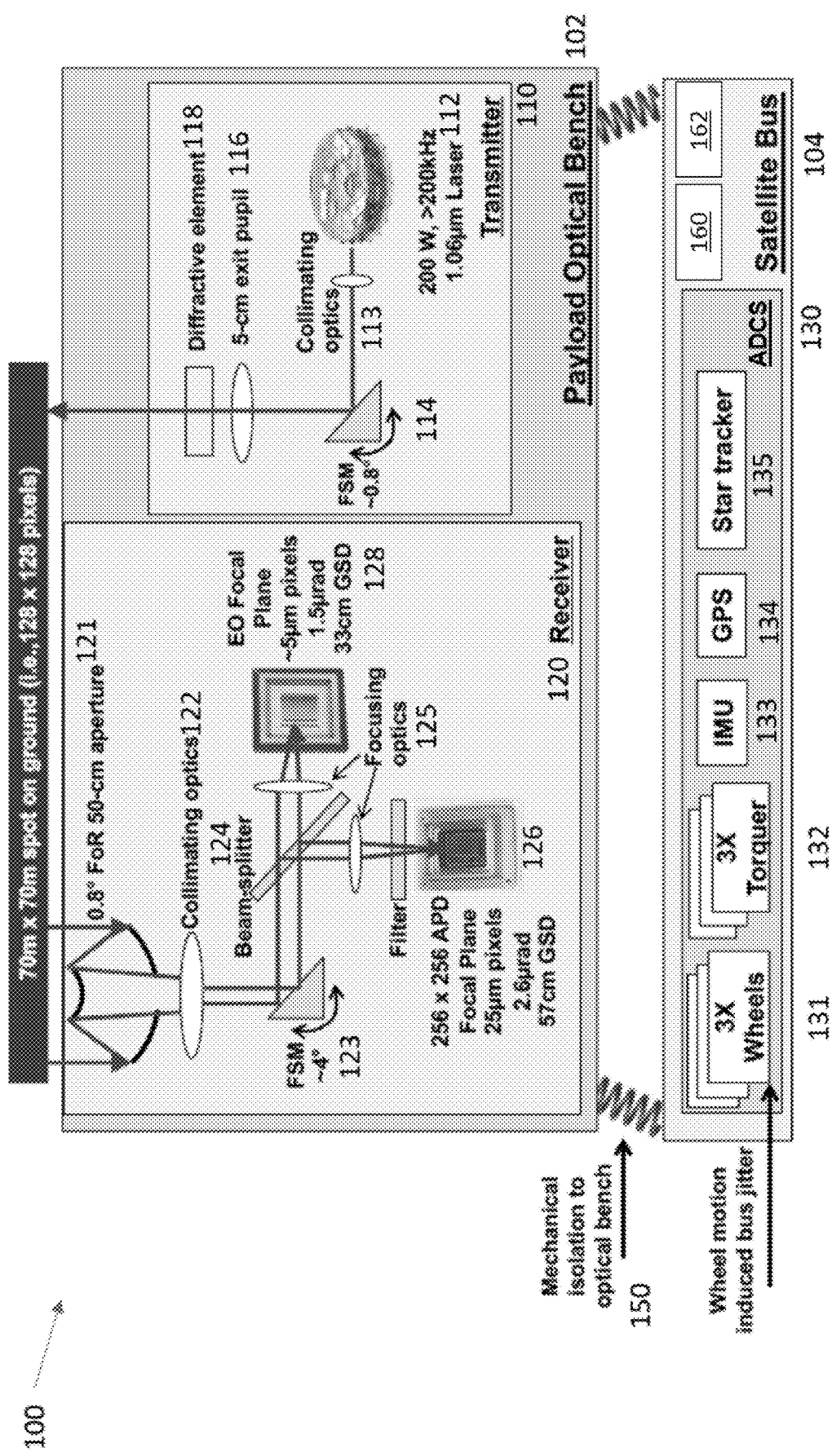

FIG. 1B shows the lidar system in greater detail. The lidar system includes a transmitter 110 and a receiver 120 fixed to a payload optical bench 102, which is mechanically isolated from the satellite's bus 104 via shock absorbers 150 or other means. The transmitter 110 includes a laser 112, such as a 200 W, 1.06 µm pulsed fiber laser with a pulse repetition frequency of 200 kHz. Collimating optics 113 collimate pulses emitted by the laser 112 and direct them to a fine-steering mirror (FSM) 114, which scans the pulses over an angular range of about 0.8°. The scanned pulses pass through a separate transmit aperture 116 (e.g., with a diameter of about 5 cm) and optional diffractive element 118 to illuminate a 70 meter by 70 meter spot on the ground 11. The diffractive element 118 makes the illuminated spot on the ground roughly square. Thanks to the angular scanning, the square spot follows the raster pattern 105 shown in FIG. 1A.

The receiver 120 includes a 50 cm telescope 121 with a 0.8° field of regard (FoR) that collects light scattered from the ground 11. (Using a separate transmit and receive apertures reduces backscatter into the receiver 120.) Collimating optics 122 direct the backscattered light to the receiver's own FSM 123, which scans in concert with the transmitter FSM 114 to keep the backscattered light centered on the receiver focal plane. A beam splitter 124 splits the collimated, backscattered light into two beams, which are focused to equivalent focal planes by focusing optics 125. In one focal plane, there is an APD array 126 (e.g., with 25 µm pixels arranged in a 256×256 array, each corresponding to approximately 2.6 µrad in output space). In the other focal plane, there is a contextual passive visible camera 128. This passive camera 128 has its own imaging optics because its F/number is much smaller than that of the APD array 126.

The satellite bus 104 is also coupled to an attitude determination and control system (ADCS) 130 that includes three torque wheels 131, three magnetotorquers 132, an inertial measurement unit (IMU) 133, a Global Positioning System (GPS) receiver 134, and a star tracker 135. The ADCS system 130 uses the IMU 133, GPS receiver 134, and star tracker 135 to determine the satellite's orientation. This orientation information can be used to determine or estimate the lidar receiver's nominal pointing angle. The ADCS system 130 uses the torque wheels 131 and magnetotorquers 132 to adjust the satellite's orientation.

The satellite 100 includes a processor 160 that is coupled to and controls both the ADCS 130 and the lidar and a memory 162 that is coupled to the processor 160. (This processor 160 can be implemented as a single device or component or multiple components dispersed among the satellite's systems and sub-systems.) Among other things, the processor 160 is responsible for acquiring the lidar and orientation data and transmitting these data to a ground station via a radio-frequency or optical data link, possibly via another satellite. Depending on its processing power and the available electrical power, the processor 160 may carry out some or all of the blind-jitter estimation process and send partially or fully compensated lidar data; in other cases, the processor 160 may send raw lidar data for processing at the destination (e.g., a ground station).

Accuracy of Space-Based, Ground-Imaging Lidar

For a surface-height map derived from the lidar data to be accurate over a large area, most of the individual height measurements should be registered to within a small fraction of a pixel (say, <⅓ pixel). This registration accuracy is possible for airborne systems but achieving it with a space-based system like the one in FIG. 1A is much more challenging for three reasons.

First, airborne systems do not need to operate at or near the diffraction limit, whereas the much longer-range space lidar in FIG. 1A typically operates close to the diffraction limit to get adequate cross-range resolution. For airborne systems, the Ground Sampling Distance (GSD) is often greater than the diffraction-limited Ground Resolved Distance (GRD). This means that the jitter could be larger than the GRD without being significant because the jitter is smaller than the GSD. For a space-based system, on the other hand, the GSD is about equal to the GRD and so the system may be more sensitive to jitter.

Second, for the airborne systems the range is a few kilometers; for a space-based system, the range is typically a few hundred kilometers. This difference in range means that, for equivalent ground resolution, a space-based system may be 100 times more sensitive to jitter than an airborne system. For an airborne system, a pointing jitter of 100 µrad might be adequate; for a space-based system to achieve similar cross-range resolution, the pointing jitter should be less than 1 µrad.

Third, for airborne systems, the pointing knowledge can be provided by highly precise pointing mirrors. For a space-based system, however, large, heavy, expensive pointing mirrors are impractical.

On the other hand, satellites already exist that do passive imaging from space. Some of these satellites have small form factors yet produce high resolution imagery. They use solar illumination typically within the visible band, which has an irradiance at earth's surface of about 500 W/m². This is about 25,000 times the surface irradiance of a typical space-based lidar. The vastly higher signal rates allow the passive imaging system to produce image frames at a high rate (e.g. 2.5 kHz), which reduces jitter-induced blurring and enables frame-to-frame image registration. Unfortunately, frame-to-frame image registration is not practical for the much lower lidar signal rates.

Fortunately, the desired registration accuracy can be achieved with a blind approach that involves estimating the 2-axis jitter time series and the surface height simultaneously (in this approach, the surface height can be viewed as a set of nuisance parameters). This approach has some similarities to blind deconvolution. Advantages of the approach include its use of available data without requiring additional sensors and the potential to compensate even very high frequency components of jitter (e.g., frequency components that are comparable to the pulse rate). A challenge that blind jitter estimation addresses is the very low signal rate, which leads to a longer dwell time, thus increasing the amount of observed jitter and blurring due to jitter. This jitter-compensation scheme can be applied to space-based lidar data as well to many scanned 3D lidar systems.

Lidar Design Considerations

Referring again to FIG. 1A, as the satellite 100 passes over a region of interest, the lidar does a raster scan 105 over the region. The transmitted beam illuminates the whole field of view (FOV) of the lidar's receive array. A narrower beam would make the signal less challenging to integrate at the expense of faster scanning to achieve the same area coverage rate, making the system more complex and heavier (e.g., due to larger reaction wheels and/or more vibration). A long and narrow beam would allow scanning at the same rate at the possible expense of worse registration errors. There may be an optimum beam aspect ratio, but the blind jitter estimation disclosed here demonstrates good performance even in the challenging case of a square beam. The raster scan can be divided into multiple lateral sweeps or smaller segments that can be processed independently.

TABLE 1

Example System Parameters

| Parameter | Value |
| --- | --- |
| Array size (fully illuminated) | 128 × 128 pixels |
| PRF | 200 kHz |
| Pulse width (FWHM) | 2 ns |
| Pulse energy | 0.5 mJ |
| Wavelength | 1 µm |
| Receive aperture diameter | 1 m |
| Receive efficiency | 0.2 |
| Oversampling factor, Q | 0.82 |
| Background count rate | 2 kHz |
| Surface reflectivity | 0.1 |
| Altitude | 440 km |
| Jitter knee frequency | 20 Hz |
| Long term jitter std. dev. | 8.9 µrad |
| Dwell time per FOV | 12.5 ms |

Table 1 lists the sample parameters of a space-based lidar system. Based on these parameters, the ground sampling distance (GSD) at zenith is $$\frac{\lambda}{D}\frac{R}{Q} = 0.57 \text{ m},$$

where $\lambda$ is the wavelength, D is the aperture diameter, R is the range, and Q is the oversampling factor. The per-pulse photoelectron (PE) return rate across the whole array is $$E_{pulse}\frac{\lambda}{hc}\frac{\rho}{\pi R^2}\pi\left(\frac{D}{2}\right)^2\gamma = 69 \text{ PE/pulse},$$

where $E_{pulse}$ the pulse energy in Joules, h is Planck's constant, c is the speed of light, $\rho$ is the target reflectivity, and $\gamma$ is the receive efficiency, which combines quantum and optical efficiency. When distributed over 128×128 pixels, this return rate becomes $4.2\times10^{-3}$ PE/pixel/pulse. At this low signal level, the dwell time is long enough that jitter may cause significant blurring. A dwell time of 12.5 ms (or 2500 pulses) results in an average of about 10 detections per GSD, which is roughly the requirement for forming a high-quality height image. Some image-formation techniques seem to require as few as 1 detection per GSD, but that impressively low number is achieved by sacrificing angular resolution. This tradeoff is undesirable for a space-based system.

Blurring and registration errors caused by jitter are more precisely caused by error in pointing knowledge, called residual jitter here. Random disturbances in pointing often have similar characteristics to random walk, with a power spectral density (PSD) that is inversely proportional to the square of frequency. The error in angle measurements made by the satellite's inertial measurement unit (IMU) tends to be dominated by angle random walk (ARW). Typically, accurate pointing information, such as from star observations, is received at a low rate, which limits what would otherwise be unbounded power in the residual jitter at low frequencies. Additionally, temporal frequencies that are much lower than the reciprocal of the dwell time do not contribute significantly to blurring. They may contribute to absolute registration errors, but image quality is often more desirable.

Figure 2:
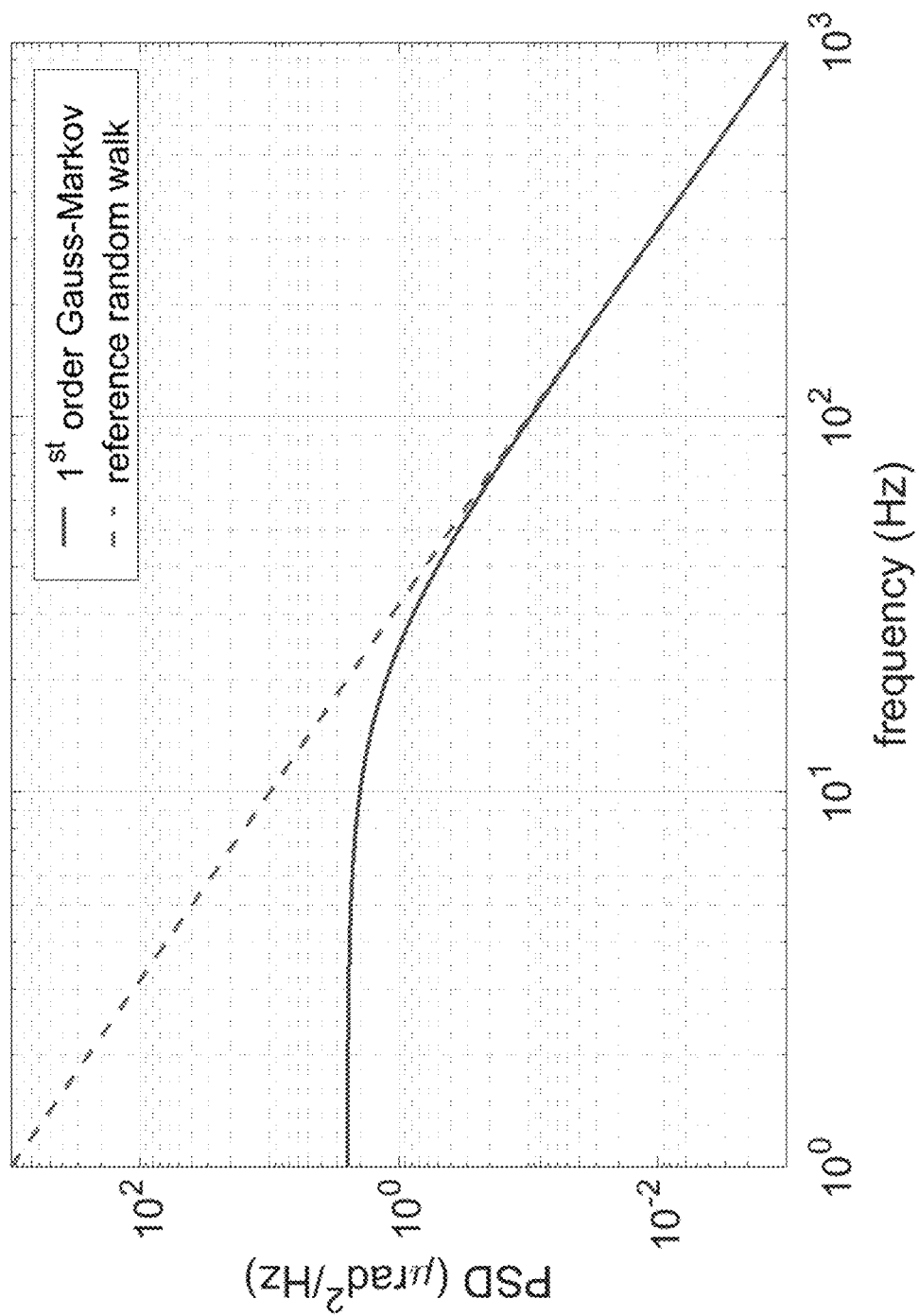

For these reasons, jitter is modeled via a first-order Gauss-Markov process, which has a PSD as shown in FIG. 2. This random process is equivalent to Gaussian white noise passed through a single-pole low pass filter. The Gauss-Markov PSD is approximately flat below its knee frequency of 20 Hz and approximates the random walk PSD above 20 Hz. The 20 Hz knee frequency was somewhat arbitrarily chosen as a factor of four below the 80 Hz reciprocal of dwell time. The scaling of the random walk PSD and consequently of the Gauss-Markov PSD was chosen to approximately match one of the largest PSDs among a set representing other satellite systems.

Many pointing systems have resonances at certain frequencies, with corresponding peaks in the jitter PSD. This is a mismatch to the assumed form of PSD, but the blind jitter estimation approach is tolerant to some peaks in the PSD if the parameters of the assumed PSD are chosen to approximately fit the upper envelope of the actual PSD. Since the jitter estimation process is statistical in nature, it is naturally robust to some amount of mismatch.

A small-angle approximation is used to translate the angular jitter into lateral motion of the optical axis on the surface, i.e., $\Delta x \approx R\theta$. Blind jitter estimation may be quite robust to errors in this approximation, partly because the estimated surface serves mainly to help estimate the jitter. (The estimated surface can also be used for a low-resolution version of the scene or for cross-correlating against neighboring lines in the raster scan to reduce low-frequency drift.) Any warping of the estimated surface would only indirectly affect the jitter estimates. Using the parameters from Table 1, the long-term RMS jitter per axis at the surface is $\Delta x \approx 440$ km×8.9 $\mu$rad=3.9 m. Since the dwell time is limited, the standard deviation of the observed jitter is smaller, at about 2.4 meters. This represents very significant blur of about 4 pixels along the x and y axes.

To make this material easier to communicate and to understand, the rest of this specification represents the application of a staring sensor rather than a continuously scanning one. This simplifies some aspects of describing the blind jitter estimation process and makes the results easier to quantify. One could consider a "step-and-stare" mode that jumps by one field of view (e.g., 70 m) after each dwell time (e.g., 12.5 ms), while a scanning sensor would slew at the same average rate, but smoothly. Most aspects of the blind jitter estimation process remain the same whether the sensor is staring or scanning.

Problem Formulation

Blind jitter estimation is a very direct (but carefully implemented) solution to an inverse problem, based on the principle of Bayes' rule. It starts with a high-fidelity statistical model of the relevant physics. Bayes' rule is applied to determine the posterior probability density of the desired parameters. Because of the high dimensionality of the state space, the blind jitter estimate is a maximum-a-posteriori (MAP) solution instead of a full probability density. Expectation Maximization provides a more tractable approximation to evaluating the posterior at a point in state space. Gradient descent is an optimization technique that works for increasing or maximizing the approximated posterior in a high dimensional space. Sparsity and locality can be exploited in the computations whenever possible, and array programming can be used for parallelization.

Physical Modeling

The projection of the lidar beam's optical axis onto the ground is known to limited precision from satellite IMU measurements and instrumentation, such as angle encoders. An orthographic projection model is used, which assumes that the change in angular pointing is small. The region of interest can be divided into sufficiently small pieces that this assumption is valid. With the orthographic projection model, angles are replaced by their projection onto the observed scene.

The satellite position and the projection of the optical axis, as determined from the IMU and instrumentation, are combined into a single 3D vector function of time:

$$g(t) = \begin{bmatrix} g_x(t) \\ g_y(t) \\ g_z(t) \end{bmatrix}$$

The coordinate frame is fixed relative to the ground, with the x-y plane orthogonal to the lidar's line of sight and the z axis pointing along the line of sight towards the satellite. The z component can be considered the range, due to the orthographic projection approximation. The x-y plane, also called the reference plane, is defined such that it is close to the surface, notionally at the average surface level. The pixels of the detector array project onto the reference plane in a grid with spacing equal to one GSD.

The three-dimensional (3D) scene is modeled as the height of a single surface relative to the reference plane, as a function of the lateral coordinates, that is: h(x, y). This type of function is sometimes referred to as a 2.5D image. Structures such as bridges or cantilevered buildings do not necessarily challenge the single-surface model (regardless of viewing angle), though they can result in abrupt changes in height. Real 3D scenes can be more complex, with multiple surfaces per GSD and fine-grained structures, such as foliage, that allow lidar returns from a variety of ranges over a small line of sight change. Nevertheless, this model is a good approximation, as there is often a strong return from the first surface, and it is likely that a large portion of the scene is well-represented by the model. The goal is to represent the surface accurately enough to facilitate estimation of the jitter.

The jitter is modeled as a 2D function of time that represents a lateral shift of the optical axis along the reference plane:

$$j(t) = \begin{bmatrix} j_x(t) \\ j_y(t) \end{bmatrix}$$

A 2D representation of rotation is adequate because the third component of rotation—about the lidar's optical axis—does not get scaled by range, so its effect is over two orders of magnitude smaller. The x and y jitter functions are assumed to be independent first-order Gauss-Markov random processes.

Figure 3:
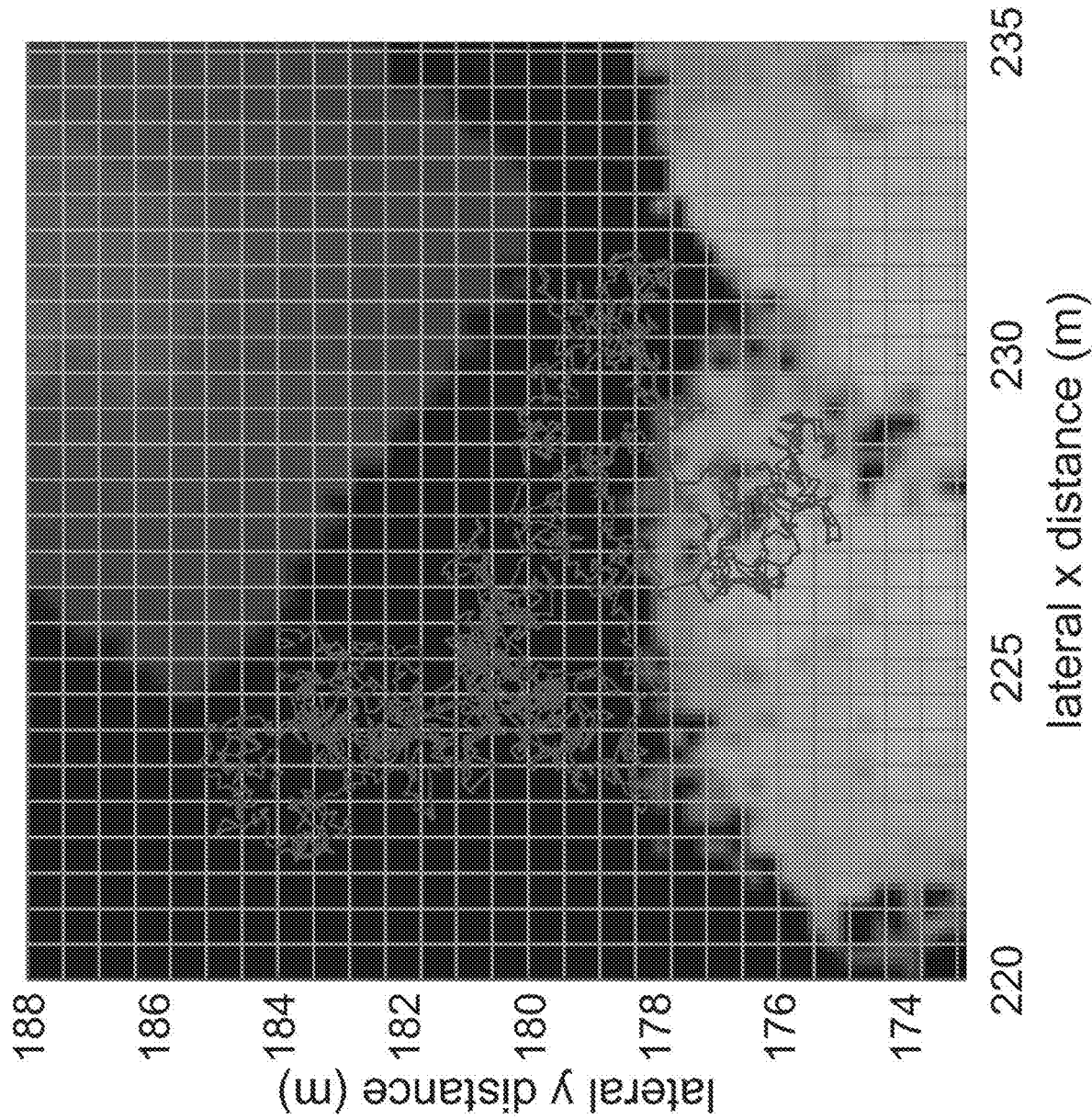
Figure 4A:
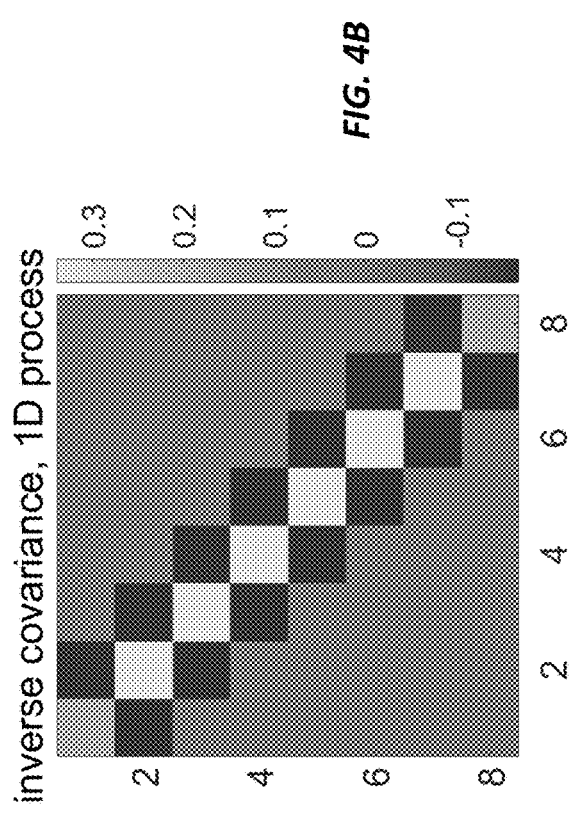
FIGS. 4A and 4B show the covariance and sparse inverse covariance, respectively, of eight samples of a one-dimensional (1D) first-order Gauss-Markov process (relevant to the jitter priors).
Figure 4B:
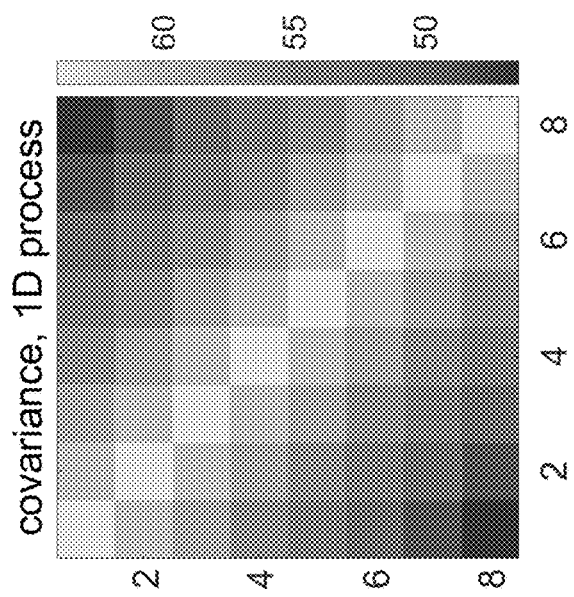
Figure 4C:
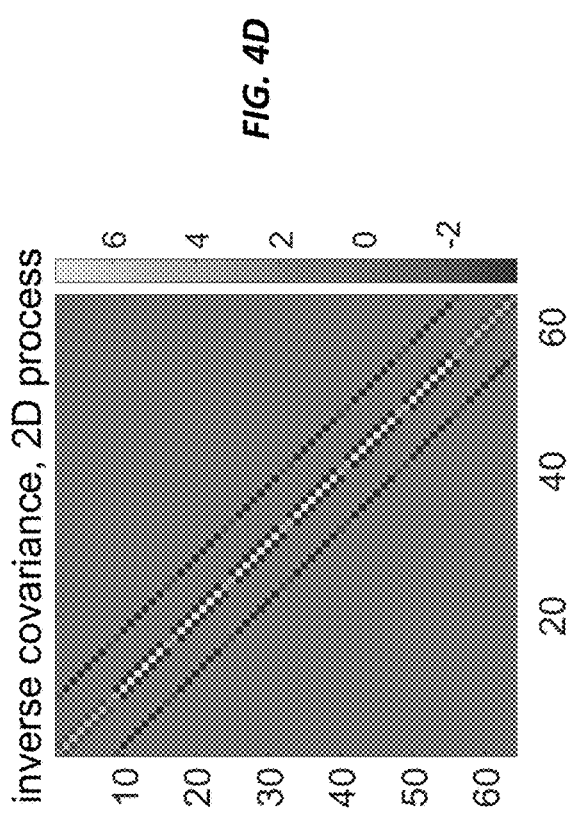
FIGS. 4C and 4D show the covariance and sparse inverse covariance, respectively, of an 8×8 sample array of a two-dimensional (2D) first-order Gauss-Markov process (relevant to the surface prior).
Figure 4D:
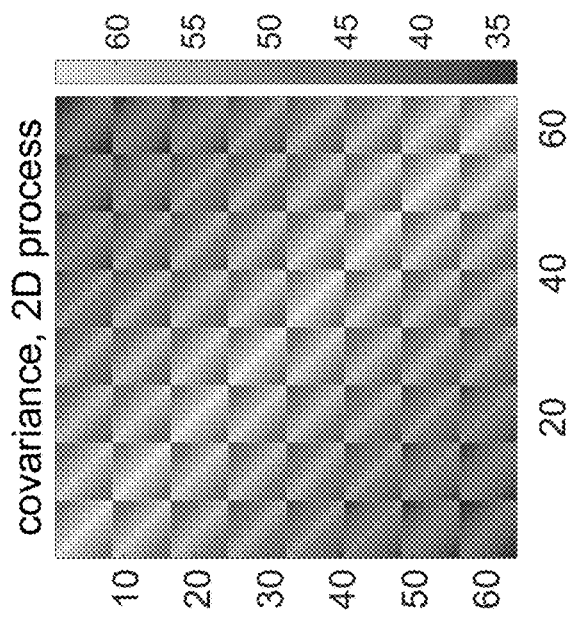

FIG. 3 illustrates the surface height with the projected pixel grid, and the jitter path as estimated using blind jitter estimation. Over the dwell time interval, the center of the pixel grid traverses the jitter path. This blurs the resulting image if the jitter isn't compensated. In FIG. 3, the jitter spans a large number of pixels, and shows the scale of the blurring effect.

Measurement Process

Each pixel in the lidar's receive array (e.g., each APD in a Geiger-mode APD array) makes an independent measurement, given the surface and jitter, which for the simulation are known quantities. The single-pixel measurement process is a Poisson process with a time-varying rate. It yields the sum of contributions from noise and signal. This single-pixel measurement process can be represented as two independent Poisson processes with rate functions that add up to the original rate. The noise can be modeled with a rate function that is constant in time, and the signal can be modeled with a rate function that is shaped like the returning pulse train after reflecting off the surface. The lidar's sensor array records the time of each photoelectron detection event, which may be due to noise or signal.

Low per-pulse detection rates are assumed for both noise and signal, in order to ignore the effects of blocking. Blocking is a characteristic of a Geiger-mode detector (pixel) in which the detector takes some time (e.g., 2 μs) to reset after detecting a photon. The detector does not detect any photons arriving within this reset time interval—the photons are "blocked" by the preceding photon detection. The reduction in detection rate is called blocking loss, which becomes significant as the rate increases towards the reciprocal of the reset time. An indirect effect of blocking is a skewing of the apparent pulse shape due to detections from the early part of the pulse preventing subsequent detections. Another effect is that statistical independence between detection times is broken. Low detection rates make it possible to ignore these complications.

The first step in modeling the signal process involves simulating the transmitted pulses. The transmit time of each pulse is recorded, which represents the center of the pulse. If the pulse energy is varied, then this is also recorded. A transmitted pulse travels at the speed of light towards the surface, reflects off the surface, and a fraction of the energy returns towards the lidar. It is convenient to define the time $t_{REF,i}$ and range $r_{REF,i}$ at which the $i^{th}$ pulse would reflect off the reference plane. These variables are called the nominal reflection time and nominal reflection range, respectively. They are found by taking the intersection of the outgoing pulse's range vs. time curve and the range vs. time function $g_z(t)$ of the reference plane.

The nominal reflection time and nominal reflection range for the $i^{th}$ pulse are related by:

$$t_{REF,i} = t_{TX,i} + \frac{r_{REF,i}}{c}$$

where c is the speed of light, and the remaining variables are defined in Table 2. Given the nominal reflection time, the nominal receive time is:

$$t_{RX,i} = t_{TX,i} + 2(t_{REF,i} - t_{TX,i})$$

The nominal receive energy is:

$$e_{RX,i} = \frac{\rho_{surface} A \gamma}{\pi} \frac{e_{TX,i}}{r_{REF,i}^2}$$

where $\rho_{surface}$ is the surface reflectivity (assumed constant), A is the receive aperture area, and $\gamma$ is the combined optical efficiency and quantum efficiency. Lambertian scattering is assumed. If $e_{RX,i}$ is expressed in units of counts, then it is the expected number of detections for the $i^{th}$ pulse, across all pixels.

In simulating measurement data, a binary indicator variable $d_{il}$ is randomly generated, which represents whether pulse i generates a detection in pixel l. This variable has a Bernoulli distribution, with parameter $e_{RX,i}/N_{pixels}$ expressed in units of counts. Low per pixel signal rate is assumed here, i.e., $e_{RX,i}/N_{pixels} \ll 1$. Another assumption here is uniform spatial illumination across pixels, though a shaped beam could be easily accommodated. The indicator variable is generated for every pulse and for every pixel.

TABLE 2

Properties of Pulses

| Variable | Description |
| --- | --- |
| $t_{TX,i}$ | transmit time (center of pulse) |
| $e_{TX,i}$ | transmit energy |
| $t_{REF,i}$ | nominal reflection time (center of pulse) |
| $T_{REF,i}$ | nominal reflection range |
| $t_{RX,i}$ | nominal receive time (center of pulse) |
| $e_{RX,i}$ | nominal receive energy |
| $d_{il}$ | detection indicator for pixel l |

Measurements are simulated over the time interval [0, T]. The sensor data contains the time and pixel number of each detection, which may arise from the signal or from background noise. For simulation of signal detections for pixel l, the detection indicator variable $d_{il}$ determines whether pulse i causes a detection. For each pulse with $d_{il}=1$, the detection time is modeled as:

$$\zeta_{k|signal} = t_{RX,i(k)} - \frac{2}{c}h(x_k, y_k) + v_k$$

where k is the detection index and i(k) is the corresponding pulse index. $v_k$ represents when the received photon was emitted relative to the center of the pulse, which is distributed as:

$$v_k \sim \text{Gaussian}(0, \sigma_{PW}^2)$$

where $\sigma_{PW}$ is the standard deviation representing the spread of the Gaussian pulse in time. Low per-pixel signal rate is assumed here, i.e., $e_{RX,i}/N_{pixels} \ll 1$, to avoid blocking-induced skewing of the probability density function (pdf) relative to the pulse shape.

The reflection coordinates at which the surface height is evaluated are defined as:

$$x_k = g_x(t_{RX,i(k)}) + j_x(t_{RX,i(k)}) + o_x(n_k) + a_{xk} + b_{xk}$$

$$y_k = g_y(t_{RX,i(k)}) + j_y(t_{RX,i(k)}) + o_y(n_k) + a_{yk} + b_{yk}$$

Both of these equations are the sum of the following five terms in x and y:
- Reported projection of the optical axis at the nominal receive time ($g_x(t_{RX,i(k)})$ and $g_y(t_{RX,i(k)})$);
- Jitter at the nominal receive time ($j_x(t_{RX,i(k)})$ and $j_y(t_{RX,i(k)})$);
- Offset of the pixel center relative to the optical axis ($o_x(n_k)$ and $o_y(n_k)$);
- Random location of photon arrival within the pixel (drawn from a uniform distribution function) ($a_{xk}$ and $a_{yk}$); and
- Optical blur ($b_{xk}$ and $b_{yk}$).

The functions $o_x(n_k)$ and $o_y(n_k)$ return the x and y coordinates, respectively, of the center of pixel $n_k$ relative to the optical axis. $a_{xk}$ and $a_{yk}$ are uniformly distributed random variables for the location of photon arrival within the pixel, relative to its center.

$$a_{xk} \sim \text{Uniform}\left(\frac{-\Delta x_{pixel}}{2}, \frac{+\Delta x_{pixel}}{2}\right)$$

$$a_{yk} \sim \text{Uniform}\left(\frac{-\Delta y_{pixel}}{2}, \frac{+\Delta y_{pixel}}{2}\right)$$

where $\Delta x_{pixel}$ and $\Delta y_{pixel}$ are the pixel widths, which are equal for square pixels. $b_{xk}$ and $b_{yk}$ are Gaussian distributed random variables representing the blur due to the diffraction pattern of the optics.

$$b_{xk} \sim \text{Gaussian}(0, \sigma_{blur}^2)$$

$$b_{yk} \sim \text{Gaussian}(0, \sigma_{blur}^2)$$

The Gaussian distribution approximates an Airy function, using $\sigma_{blur} = 0.42\lambda/D$, where $\lambda$ is the wavelength and D is the aperture diameter.

Background noise can come from dark counts or from sources outside the sensor that are uncorrelated with the pulses. Background noise is modeled as a Poisson point process, so the number of detections within the dwell time for a given pixel follows a Poisson distribution:

$$N_{noise,l} \sim \text{Poisson}(f_{noise,l}T)$$

where $f_{noise,l}$ is the background count rate for pixel l and T is the dwell time. The $N_{noise,l}$ individual detection times $\zeta_{k|noise}$ are each independent and uniformly distributed over the dwell time:

$$\zeta_{k|noise} \sim \text{Uniform}(0,T)$$

This is repeated to generate the noise for all pixels.

Once all signal and noise detections have been generated, they are merged by concatenating the two sequences, and then sorting into time order. Repeating this process for all pixels results in the measurement data, which is the sequence of pixel number/detection time pairs for all detections within the dwell time: $\{n_k, \zeta_k\}_{k=1:N}$.

TABLE 3

Properties of Detections

| Variable | Description |
| --- | --- |
| $\zeta_k$ | detection time (time of detection of a photoelectron) |
| $n_k$ | pixel number |
| $s_k$ | source indicator (noise or signal) |
| $x_k$ | x coordinate of surface reflection of photon (valid only for signal detections) |
| $y_k$ | y coordinate of surface reflection of photon (valid only for signal detections) |

Estimation Approach—State Representation

The state is defined as a vector with three parts, representing the x jitter, y jitter, and surface height:

$$\theta = \begin{bmatrix} \theta_x \\ \theta_y \\ \theta_h \end{bmatrix}$$

The jitter and surface height functions are defined in a parametric form as the weighted sum of regularly spaced kernel functions. Each part of the state vector is a set of weights. The x and y jitter functions are:

$$j_x(t; \theta_x) = \sum_i \theta_x(i) \phi_{jitter}\left(\frac{t - t_{grid}(i)}{\Delta t_{grid}}\right)$$

$$j_y(t; \theta_y) = \sum_i \theta_y(i) \phi_{jitter}\left(\frac{t - t_{grid}(i)}{\Delta t_{grid}}\right)$$

where $t_{grid}$ is a vector of uniformly spaced times with interval $\Delta t_{grid}$. The jitter kernel is the triangular function, which makes the jitter functions equivalent to linear interpolation of the state vector elements.

$$\phi_{jitter}(t) = \begin{cases} 1 - |t| & |t| < 1 \\ 0 & \text{otherwise} \end{cases}$$

The sampling interval $\Delta t_{grid}$ for defining the jitter sequences is chosen to be 10 μs, which is twice the pulse interval. This seems to be a good tradeoff between accurately representing the jitter and reducing the size of the state vector.

The height function is:

$$h(x, y; \theta_h) = \sum_{i,k} \theta_h(i, k) \phi_{surface}\left(\frac{x - x_{grid}(i)}{\Delta x_{grid}}, \frac{y - y_{grid}(k)}{\Delta y_{grid}}\right)$$

where $x_{grid}$ and $y_{grid}$ are uniformly spaced distance vectors with intervals $\Delta x_{grid}$ and $\Delta y_{grid}$, respectively. The double indexing of the state vector can be interpreted as if the vector were reshaped into the size of the 2D grid. The surface kernel is a 2D Gaussian function. A Gaussian kernel shape was chosen because it is smooth and convenient for taking derivatives, but it decays rapidly. The rapid decay simplifies the evaluation of the height function at a point by only requiring the evaluation of kernels within a small vicinity. The 2D Gaussian kernel can be expressed as the product of two 1D Gaussian functions:

$$\phi_{surface}(x, y) = \phi_G(x)\phi_G(y)$$

$$\phi_G(w) = \exp\left(-\frac{1}{2}\left(\frac{w}{\sigma}\right)^2\right)$$

The kernel width is determined by the standard deviation, which is chosen to be $\sigma=\frac{1}{2}$. The lateral sampling interval ($\Delta x_{grid}$ and $\Delta y_{grid}$) for defining the surface is chosen to be three GSDs. This represents a compromise between good performance and fast/reliable convergence. A finer sampling grid would allow more accurate representation of the surface, which would potentially improve estimation performance at the expense of increased compute time. However, making the sampling grid too fine can greatly hinder convergence.

Table 4 describes the size and spacing of the sampling grids, and therefore the sizes of the state vector components. The state vector is quite large, with multiple thousands of elements, so care should be taken in implementation.

TABLE 4

Sampling Grids and Interpolation Kernels

| State elements | Dimension | Sampling interval | Kernel |
|---|---|---|---|
| x jitter ($\theta_x$) | 1251 | 10 μs | triangular (linear interpolation) |
| y jitter ($\theta_y$) | 1251 | 10 μs | triangular (linear interpolation) |
| surface ($\theta_h$) | 53 × 53 | 3 GSD | 2D Gaussian ($\sigma$ = 1.5 GSD) |

Priors

The jitter and surface height functions are expected to be slowly varying, and this represents prior information that can be exploited. The jitter functions are modeled as two independent, uniformly sampled, first-order Gauss-Markov processes, so the $\theta_x$ and $\theta_y$ parts of the state vector are independent and identically distributed Gaussian random vectors with zero mean.

$\theta_x$~Gaussian(0,$Q_x$)

$\theta_y$~Gaussian(0,$Q_y$)

The covariance matrix is large and non-sparse, but its inverse is conveniently sparse. It is a tridiagonal matrix with only three unique non-zero values, which are given by:

$$Q_x^{-1} = Q_y^{-1} = \begin{cases} \frac{1}{(1-\rho^2)\sigma^2} & \text{first and last diagonal elements} \\ \frac{1+\rho^2}{(1-\rho^2)\sigma^2} & \text{elsewhere on diagonal} \\ \frac{-\rho}{(1-\rho^2)\sigma^2} & \text{on first-off diagonals} \\ 0 & \text{elsewhere} \end{cases}$$

where $\rho$ is the correlation coefficient between adjacent samples, given by:

$$\rho=\exp(-2\pi f_{knee}\Delta t_{grid})$$

The long term standard deviation $\sigma$ and knee frequency $f_{knee}$ are matched to the jitter PSD with the parameters in Table 1. The covariance and inverse covariance are illustrated in FIGS. 4A-4D.

The surface height function is modeled as a 2D uniformly sampled first-order Gauss-Markov process (Markov random field). The vectorized array of height coefficients $\theta_h$ is also a Gaussian random vector.

$\theta_h$~Gaussian($\bar{\theta}h,Q_h$)

The mean height coefficient, $\bar{\theta}_h$, might be set by some preexisting knowledge of the surface, such as a Digital Elevation Model (DEM), or it might be zero. The covariance is a Kronecker product of two matrices:

$$Q_h = \left(\frac{1}{\sigma}Q_{hy}\right) \otimes \left(\frac{1}{\sigma}Q_{hx}\right)$$

Here, $Q_{hx}$ and $Q_{hy}$ are the covariance matrices of 1D slices of the height coefficient array along the x and y directions, respectively. They have the same form as the jitter prior covariances $Q_x$ and $Q_y$ but different values for $\sigma$ and $\rho$. Based on the statistics of the target scene, $\sigma=8$ meters and $\rho=0.87$. $Q_{hx}$ and $Q_{hy}$ should share the same parameters ($\sigma$ and $\rho$) but may differ in size if the height coefficient array is not square. The composite covariance $Q_h$ is again non-sparse, but its inverse is sparse. $Q_h^{-1}$ is a nine-banded array with six unique non-zero values. Since the inverse of a Kronecker product is the Kronecker product of the inverses, the inverse covariance can be written as:

$$Q_h^- = (\sigma Q_{hy}^{-1}) \otimes (\sigma Q_{hx}^{311})$$

Since the three parts of the state vector are independent (in the absence of measurements), the total prior can be written as the product $p(\theta)=p(\theta_x)p(\theta_y)p(\theta_h)$. The product and each of the three terms is a multivariate Gaussian with the form:

$$p(\theta) = \text{Gaussian}(\bar{\theta}, Q) = \exp\left(-\frac{1}{2}(\log|2\pi Q|) + (\theta-\bar{\theta})^T Q^{-1}(\theta-\bar{\theta})\right)$$

Expectation Maximization (EM)

The state estimation uses Expectation Maximization (EM) to deal with the uncertainty of whether each detection arose from noise or signal, in a robust way. "Noise" and "signal" are considered to be two components in a mixture pdf. EM estimates the component probabilities and the parameters of each component. For this application, only the signal component has parameters to estimate. Since the noise component represents a Poisson process with a constant rate, it is uniform over a fixed interval. Blind jitter estimation should be robust to spatially varying background but does not exploit it.

EM can be extended to accommodate background light sources or non-uniform solar illumination by estimating the background as a function of spatial location. This fits nicely into the EM framework and may result in the noise component having its own states.

One aspect of EM as applied here is the estimation of the "membership" of each measurement. This is a probability vector for each detection, representing whether it is noise or signal.

Figure 5:
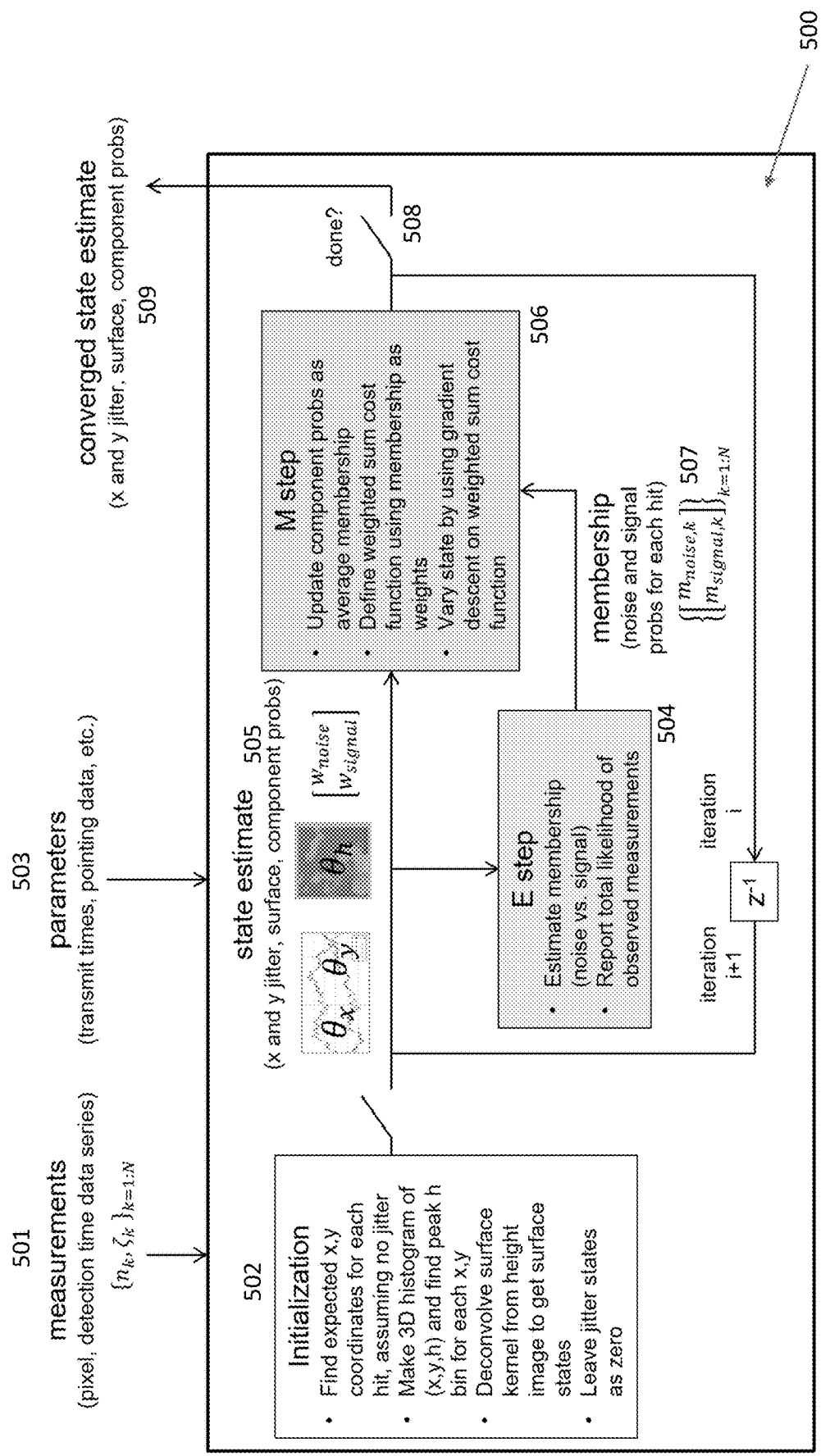
FIG. 5 is a flow chart illustrating expectation maximization (EM) flow in a blind jitter estimation process.

FIG. 5 illustrates an EM process 500 as applied to blind jitter estimation. This EM process 500 starts with initialization (step 502; {w, θ}=initialize( )), where w is the two-element component probability vector and θ is the initial state vector. The two components of the component probability vector w are a signal member $w_{signal}$ that represents signal (e.g., a photon detection) and a noise member $w_{noise}$ that represents noise. And the state vector includes the initial surface height $θ_h$, which is based on lidar measurements 501 and lidar parameters 503, and initial guesses $θ_x$ and $θ_y$ for the x and y jitters. (Though not written explicitly, each step in the EM process 500 has access to the measurements 501 and assorted parameters 503.)

In the first E step (504), the initial state vector is used to estimate the membership m (507) of each measurement (m=E-step(w, θ)). In the first M step (506), the estimated membership array from the preceding E step is taken as given and a perturbation is made to the state vector estimate to reduce a cost function ({w, θ}=M-step(m, θ)). The membership weights the contribution of each detection to the cost function. The EM process 500 iterates over the E step (504) and M step (506) until reaching a stopping criterion (508), at which point the EM process 500 yields a converged state estimate 509. The stopping criterion can be based on the change in the state vector θ, the change in the membership m, the change in total likelihood of data (available in the E step), the number of iterations, and/or the elapsed processing time.

Initialization

EM performance and speed are both improved by a careful initialization. The jitter states $θ_x$ and $θ_y$ are initialized as zeros. The two-element component probability vector w can be set to [0.5; 0.5] or can be based on the expected noise and signal rates. The height states $θ_h$ are initialized by forming a height image without jitter compensation, and then doing a fit to the image.

For each detection, the measured height is calculated as:

$$h_k = -\frac{c}{2}(\zeta_k - t_{RX,i(k)})$$

i(k) is defined here as the index of the nearest pulse to the observed detection time, that is:

$$i(k) = \arg\min_i(|\zeta_k - t_{RX,i}|)$$

The expected ground sample coordinates are calculated as:

$$\bar{x}_k = g_x(t_{RX,i(k)}) + o_x(n_k)$$

$$\bar{y}_k = g_y(t_{RX,i(k)}) + o_y(n_k)$$

Next, a 3D histogram of the ($\bar{x}_k$, $\bar{y}_k$, $h_k$) triplets is made. The "measured" height image is formed by taking the height bin with the most counts for each (x, y) bin. The bin spacing can be selected based on signal-to-noise ratio (SNR) or to match the 2D grid on which the surface states are defined.

If the height image is defined over the same 2D grid as the surface states, then an initial estimate of the surface states can be made by deconvolving the surface kernel from the height image. The deconvolution can be implemented via division in the frequency domain. An alternative approach for initialization is to do a least-squares fit to the height image, with the measurement matrix representing convolution with the surface kernel. The least squares method is more general and allows the option of incorporating a prior for the surface states, but it is multiple orders of magnitude slower than deconvolution and is unnecessary.

E-Step

The E-step updates the membership of each detection. To define membership, first consider a discrete variable $s_k$ that indicates whether a particular detection arose from noise or signal.

$$s_k \in \{noise, signal\}$$

This indicator variable is not known but can be estimated. Define the membership of detection k as a vector $m_k$ that represents the conditional probability distribution of $s_k$:

$$m_k = \begin{bmatrix} m_{noise,k} \\ m_{signal,k} \end{bmatrix} = \begin{bmatrix} P(s_k = noise | \zeta_k) \\ P(s_k = signal | \zeta_k) \end{bmatrix} = C_k \begin{bmatrix} p(\zeta_k | s_k = noise)w_{noise} \\ p(\zeta_k | s_k = signal)w_{signal} \end{bmatrix}$$

where $C_k$ is a scalar that normalizes $m_k$ such that the sum of its elements is 1. $w_{noise}$ and $w_{signal}$ are the noise and signal component probabilities.

If the source is noise, then the detection time is simply uniform over the dwell time interval:

$$p(\zeta_k | s_k = noise) = \frac{1}{T}$$

If the source is signal, then the detection time is distributed as a Gaussian sum, assuming a Gaussian pulse shape. For pulses that are narrow relative to the pulse spacing, taking only the nearest Gaussian is a very good approximation:

$$p(\zeta_k | s_k = signal) = \sum_i u_i \exp\left\{-\frac{1}{2}\left[\log(2\pi\sigma_{t,i}^2) + \left(\frac{\zeta_k - \bar{t}_i}{\sigma_{t,i}}\right)^2\right]\right\} \approx$$

$$u_{i(k)} \exp\left\{-\frac{1}{2}\left[\log(2\pi\sigma_{t,i(k)}^2) + \left(\frac{\zeta_k - \bar{t}_{i(k)}}{\sigma_{t,i(k)}}\right)^2\right]\right\}$$

Another assumption here is that the height variation in the scene is significantly less than the pulse spacing. The weights of the Gaussian sum are the normalized receive energies:

$$u_i = \frac{e_{RX,i}}{\Sigma_i e_{RX,i}}$$

If the range does not change significantly over the dwell time, and other things remain constant, then the weights should be approximately equal to the reciprocal of the number of pulses within the dwell time interval.

The mean of the Gaussian distribution is:

$$\bar{t}_{i(k)} = t_{RX,i(k)} - \frac{2}{c}h(\bar{x}_k, \bar{y}_k; \theta_h)$$

$\bar{x}_k$ and $\bar{y}_k$ are the mean coordinates of where the photon reflected off the surface (this time treating jitter as a known quantity):

$$\bar{x}_k = g_x(t_{RX,i(k)}) + j_x(t_{RX,i(k)}; \theta_x) + o_x(n_k)$$

$$\bar{y}_k = g_y(t_{RX,i(k)}) + j_y(t_{RX,i(k)}; \theta_y) + o_y(n_k)$$

The variance of the Gaussian distribution is the sum of the variance representing the Gaussian pulse shape and a term representing the broadening of the pulse due to the height variation over the lateral uncertainty of the measurement. The effect is that of convolving the pulse with the impulse response of the surface.

FIG. 6 illustrates the translation of lateral uncertainty into height uncertainty using a local linear (planar) approximation to the surface. Accordingly, the lateral variances are multiplied by the squared gradients of the height function. The resulting standard deviation of the detection time is:

$$\sigma_{t,i(k)} \approx \sqrt{\sigma_{PW}^2 + \left(\frac{2}{c}\right)^2 \left[H_x^2(\bar{x}_k, \bar{y}_k; \theta_h)\sigma_x^2 + H_y^2(\bar{x}_k, \bar{y}_k; \theta_h)\sigma_y^2\right]}$$

where $H_x$ and $H_y$ are gradients of the height function with respect to x and y, as given in the appendix. The lateral variances are the sum of the variance of the uniformly distributed location of arrival and the variance of the optical blur.

$$\sigma_x^2 = \frac{\Delta x_{pixel}^2}{12} + \sigma_{blur}^2$$

$$\sigma_y^2 = \frac{\Delta y_{pixel}^2}{12} + \sigma_{blur}^2$$

The pdf can alternately be expressed in terms of relative range rather than absolute time by changing variables:

$$p(\zeta_k \mid s_k = \text{signal}) \approx u_{i(k)} \frac{c}{2} \exp\left\{-\frac{1}{2}\left[\log(2\pi\sigma_{r,i(k)}^2) + \left(\frac{\Delta r_k}{\sigma_{r,i(k)}}\right)^2\right]\right\}$$

which is a function of the range difference and range uncertainty given by:

$$\Delta r_k = \frac{c}{2}(\zeta_k - \bar{t}_{i(k)})$$
$$= \frac{c}{2}(\zeta_k - t_{RX,i(k)}) + h(\bar{x}_k, \bar{y}_k, \theta_h)$$
$$\sigma_{r,i(k)} = \frac{c}{2}\sigma_{t,i(k)}$$
$$= \sqrt{\left(\frac{c}{2}\sigma_{PW}\right)^2 + H_x^2(\bar{x}_k, \bar{y}_k; \theta_h)\sigma_x^2 + H_y^2(\bar{x}_k, \bar{y}_k; \theta_h)\sigma_y^2}$$

M-Step

The M-step updates the estimate of the state vector and component probabilities. The weights are updated by taking the maximum likelihood estimate, which is found by averaging the membership across all measurements:

$$\begin{bmatrix} w_{noise} \\ w_{signal} \end{bmatrix} = \frac{1}{N} \sum_k \begin{bmatrix} m_{noise,k} \\ m_{signal,k} \end{bmatrix}$$

In EM, each measurement can come from one of multiple components of a mixture pdf. Generally, each component has a set of parameters that are updated in the M-step. In this application, only the signal component has parameters (i.e., elements of the state vector) to update.

The state vector estimate is updated by using gradient descent to reduce a weighted sum cost function, where the weights are the membership of the signal component. Gradient descent is used because of the nonlinearity of the measurement function and because of the high dimensionality of the state space. With approximately 5000 state elements (and potentially more for a scanning mode), a particle filter is not feasible, and even a covariance matrix starts to become unwieldy. There are three reasons for settling for a reduction in the cost function rather than a minimization. First, there is no known closed form solution. Second, the cost function is relatively expensive to evaluate. Third, the cost function becomes less valid as the distance from the current state estimate increases. The cost function gets refreshed by the E-step. Therefore, it makes sense to take smaller steps and update the cost function frequently. Reducing rather than minimizing the cost function in the M-step means this version of EM is Generalized Expectation Maximization (GEM).

The cost function is a modified version of the negative log of the posterior probability density given that the source is signal. The modification, which is associated with EM, is the weighting of the contribution of each measurement by its signal component membership $m_{signal,k}$. The cost function is:

$$\Psi(\theta) = -\log(p(\theta)) - \sum_k m_{signal,k} \log(p(\zeta_k \mid \theta, s_k = \text{signal}))$$

where $p(\theta)$ is the Gaussian prior pdf described above. $p(\zeta_k\mid\theta, s_k=\text{signal})$ is given above, but here is represented with explicit conditioning on the state vector.

Gradient descent is used to take a step that reduces the cost function. This involves the partial derivatives of the cost function with respect to the state:

$$\frac{\partial \Psi}{\partial \theta} = \frac{\partial}{\partial \theta}(-\log(p(\theta))) + \sum_k m_{signal,k} \frac{\partial}{\partial \theta}(-\log(p(\zeta_k \mid \theta, s_k = \text{signal})))$$

The partial derivatives of the term representing the prior are:

$$\frac{\partial}{\partial \theta}(-\log(p(\theta))) = (\theta - \bar{\theta})^T Q^{-1}$$
$$= (\theta_x - \bar{\theta}_x)^T Q_x^{-1} \frac{\partial \theta_x}{\partial \theta} + (\theta_y - \bar{\theta}_y)^T Q_y^{-1} \frac{\partial \theta_y}{\partial \theta} + (\theta_h - \bar{\theta}_h)^T Q_h^{-1} \frac{\partial \theta_h}{\partial \theta}$$

where $\bar{\theta}$ and Q are the mean and covariance of the prior, respectively. Due to sparsity, the prior and its partial derivatives can be evaluated without explicitly representing the covariance matrices or their inverses.

The partial derivatives in the sum are:

$$\frac{\partial}{\partial \theta}\{-\log[p(\zeta_k \mid s_k = \text{signal})]\} = -\frac{\partial}{\partial \theta}\log\left(u_{i(k)}\frac{c}{2}\right) + \frac{1}{2}\frac{\partial}{\partial \theta}\left[\log(2\pi\sigma_{r,i(k)}^2) + \left(\frac{\Delta r_k}{\sigma_{r,i(k)}}\right)^2\right]$$
$$= \frac{1}{\sigma_{r,i(k)}}\left\{\left[1 - \left(\frac{\Delta r_k}{\sigma_{r,i(k)}}\right)^2\right]\frac{\partial \sigma_{r,i(k)}}{\partial \theta} + \frac{\Delta r_k}{\sigma_{r,i(k)}}\frac{\partial \Delta r_k}{\partial \theta}\right\}$$

where the partial derivatives of the range difference and range standard deviation are:

$$\frac{\partial \Delta r_k}{\partial \theta} = \frac{\partial h}{\partial \theta}$$

$$\frac{\partial \sigma_{r,i(k)}}{\partial \theta} = \frac{1}{\sigma_{r,i(k)}}(\sigma_x^2 H_x \frac{\partial H_x}{\partial \theta} + \sigma_y^2 H_y \frac{\partial H_y}{\partial \theta})$$

The height gradients and remaining partial derivatives are given below. This completes the derivation of the gradient of the cost function.

Gradient descent is used to improve the state estimate by trying various step sizes in the opposite direction of the gradient. A step size multiplier a determines the new state vector at which the cost function is evaluated. If i is the iteration number, a candidate state vector estimate is found as:

$$\hat{\theta}_{test} = \hat{\theta}_i - \alpha \frac{\partial \Psi}{\partial \theta}$$

If the cost is improved, then the previous state estimate is replaced with the new one, and the M-step is complete.

$$\hat{\theta} = \hat{\theta}_{test} \text{ if } \Psi(\hat{\theta}_{test}) < \Psi(\hat{\theta}_i)$$

Otherwise, the next value of α in a descending logarithmically spaced list is tried.

FIG. 7 shows the typical shape of the cost function vs. α. This shape makes the optimization very stable. Too large of a step size increases the cost, and too small of a step size reduces the cost only slightly. A better minimum may exist for much larger step sizes, but the goal is only to move towards the local minimum. It is not important to truly minimize the cost function at any given iteration of EM.

Experimental Results and Discussion

The blind jitter estimation process was tested with simulated data that was generated with the parameters listed in Table 1. The simulation used a high resolution height map from the MACHETE airborne lidar of the vicinity of the Boston Common visitor center to represent the true scene. The blind jitter estimation process was implemented in vectorized MATLAB code using the gpuArray functionality. To drastically reduce computation time, when evaluating the height function or its gradients, only the kernels for the nearest 5×5 array of coefficients were evaluated. This is a good approximation because of the rapid decay of the 2D Gaussian kernel. The measurements were also range-gated to isolate the returns within a 50-meter interval centered on the scene. The code was run on an LLGrid node with an Intel Xeon E5 processor and NVIDIA Tesla K80 GPU. The blind jitter estimation process was allowed to continue until it converged to within single precision after 8208 iterations, running at about eight iterations per second.

FIGS. 8A-8F show the evolution of the x and y jitter (FIGS. 8A-8C) and height (FIGS. 8D-8F) parts of the state vector as the blind jitter estimation process progresses from initialization (FIGS. 8A and 8D) to 20 iterations (FIGS. 8B and 8E) to convergence (FIGS. 8C and 8F, where 1000 iterations is considered full convergence). FIGS. 8A-8C also show the signal-component probability $w_{signal}$, which increases with iterations as the improved state estimates allow more signal to be pulled out of the noise. The x and y jitters states start as all zeros and eventually acquire the precise shapes of the x and y jitter time series. Concurrently, the height states approach the shape of the scene, becoming sharper and more resolved. This is despite the height states not representing height directly, but rather the weights of the 2D Gaussian kernels. The margin around the height images allows for the extent of the jitter, which is known statistically a priori.

FIGS. 9A and 9B illustrate the evolution of the estimated and residual x axis jitter, respectively, with multiple iterations plotted together for comparison. At full convergence, the estimated jitter matches the true jitter extremely well, aside from a small amount of mostly white noise and a constant bias, which represents a registration error. The constant bias is not observable from the data alone. It could be observed if spatially varying surface height data is encoded in the prior of the height states, effectively allowing registration against the prior knowledge of the surface. The registration problem can also be handled via image cross-correlation. This can be implemented as a post-processing step, where it would benefit from the greatly reduced blurring in the compensated input images.

FIG. 10A shows the standard deviation over the dwell time of the residual jitter as the iterations progress during blind jitter estimation. The standard deviation of the residual jitter nicely quantifies the blurring effect of residual jitter. This is the angle-resolution-degrading quantity that adds in quadrature to the terms due to the diffraction limit and the pixel size. After reducing the residual jitter standard deviation for the x and y axes to about the same size (0.15 m to 0.19 m depending on level of convergence) as the diffraction limit (0.20 m standard deviation) and the pixel width (0.16 m standard deviation), the jitter is no longer the limiting term for angular resolution.

For comparison, the left axis of FIG. 10A also shows the diffraction limit, pixel quantization limit, and an estimate derived from a baseline jitter estimation process. The baseline jitter estimation process estimates the jitter via frame-to-frame registration. This approach divides the dwell time into a number of frames and forms a height image for each frame. The height images are formed via the same histogram-based approach used for initialization, with a spatial sampling interval of 1 GSD. The height image is then range-gated to a 40-meter interval, which is approximately the height extent of the scene. Elements of the height image that are outside of the range gate are replaced with the mean of the elements within the range gate. Then the mean height is subtracted from the elements within the range gate. A cross-correlation is performed for each pair of consecutive frames (using circular convolution for simplicity). The difference in jitter between the two frames is estimated as the shift that maximizes the cross-correlation. The cumulative sum of these differences is taken and scaled by the GSD to produce the estimated jitter time sequence. Linear interpolation is used to evaluate this sequence at arbitrary times.

To find the most favorable parameters for the baseline jitter estimation process, a parameter sweep was done over the number of frames to divide the dwell time into. The minimum standard deviation of residual jitter was achieved with the dwell time divided into about 20 frames of size 625 μs or 125 pulses. With this optimal frame size, the standard deviation of residual jitter for the baseline algorithm was about 0.8 meters, which is roughly a factor of three improvement compared to no compensation. However, it is also four times worse than blind jitter estimation.

FIG. 10B shows the x and y components of the residual jitter time series plotted against each other. These residual jitter paths are analogous to blur functions that get convolved with the true scene to produce degraded blurred height images. The converged residual jitter path is drastically smaller and more point-like than the original residual jitter path.

FIGS. 11A-11C show jitter-compensated height images at varying levels of convergence. The same histogram method of image reconstruction is used here as was used for initialization, except that here the estimated jitter time series is used to shift the x and y coordinates of the measurements as a function of receive time. This image forming and coincidence processing is simple and demonstrates the effect of jitter compensation. For reference, FIG. 11D shows passive imagery from Google Earth, FIG. 11E shows the high resolution height map used as truth for simulating the measurements, and FIG. 11F shows the result of perfectly jitter-compensating the measurements.

The uncompensated image (iteration 0) in FIG. 11A is extremely blurred, with many trees blurring together as well as the two sections of the building. The jitter path is overlaid for comparison and can be seen to span many pixels. At partial convergence (iteration 20) in FIG. 11B, the image is much sharper, but still partially blurred. The fully converged image (iteration 1000) in FIG. 11C has drastically enhanced resolution and looks very similar to the perfectly compensated image in FIG. 11F that results if the true jitter were known exactly. The residual jitter path (blur function) is collapsed to a point, smaller than one pixel. Small objects are resolved which were not present in the uncompensated image. The compensated images expand as the jitter estimates improve, and the optical axis traces out a path parallel to the actual jitter. Also evident is the registration bias between the compensated images and the perfectly compensated image.

Gradients and Partial Derivatives

The E and M steps described above use the gradient of the height function, and the M step also uses partial derivatives of the jitter and height functions with respect to the state. The jitter and height functions can be written in a compact form, as an inner product between a coefficient vector and part of the state vector:

$$j_x = \Phi_j^T \theta_x$$

$$j_y = \Phi_j^T \theta_y$$

$$h = (\Phi_y \otimes \Phi_x)^T \theta_h$$

The terms in the first and second gradients of the height function are:

$$H_x = \frac{\partial h}{\partial x} = (\Phi_y \otimes \Phi'_x)^T \theta_h$$

$$H_y = \frac{\partial h}{\partial y} = (\Phi'_y \otimes \Phi_x)^T \theta_h$$

$$H_{xx} = \frac{\partial^2 h}{\partial x^2} = (\Phi_y \otimes \Phi''_x)^T \theta_h$$

$$H_{xy} = \frac{\partial^2 h}{\partial x \partial y} = (\Phi'_y \otimes \Phi'_x)^T \theta_h$$

$$H_{yy} = \frac{\partial^2 h}{\partial y^2} = (\Phi''_y \otimes \Phi_x)^T \theta_h$$

For the jitter functions, if the jitter time grid has L samples, the coefficient vector is:

$$\Phi_j = \begin{bmatrix} \phi_{jitter}\left(\frac{t - t_{grid}(1)}{\Delta t_{grid}}\right) \\ \vdots \\ \phi_{jitter}\left(\frac{t - t_{grid}(L)}{\Delta t_{grid}}\right) \end{bmatrix}$$

The coefficient vector for the height function is a Kronecker product of two vectors. If the grid of height coefficients is M by N, the two vectors and their first and second derivatives are:

$$\Phi_x = \begin{bmatrix} \phi_G\left(\frac{x - x_{grid}(1)}{\Delta x_{grid}}\right) \\ \vdots \\ \phi_G\left(\frac{x - x_{grid}(M)}{\Delta x_{grid}}\right) \end{bmatrix}$$

$$\Phi'_x = \frac{1}{\Delta x_{grid}} \begin{bmatrix} \phi'_G\left(\frac{x - x_{grid}(1)}{\Delta x_{grid}}\right) \\ \vdots \\ \phi'_G\left(\frac{x - x_{grid}(M)}{\Delta x_{grid}}\right) \end{bmatrix}$$

$$\Phi''_x = \frac{1}{\Delta x_{grid}^2} \begin{bmatrix} \phi''_G\left(\frac{x - x_{grid}(1)}{\Delta x_{grid}}\right) \\ \vdots \\ \phi''_G\left(\frac{x - x_{grid}(M)}{\Delta x_{grid}}\right) \end{bmatrix}$$

$$\Phi_y = \begin{bmatrix} \phi_G\left(\frac{y - y_{grid}(1)}{\Delta y_{grid}}\right) \\ \vdots \\ \phi_G\left(\frac{y - y_{grid}(N)}{\Delta y_{grid}}\right) \end{bmatrix}$$

$$\Phi'_y = \frac{1}{\Delta y_{grid}} \begin{bmatrix} \phi'_G\left(\frac{y - y_{grid}(1)}{\Delta y_{grid}}\right) \\ \vdots \\ \phi'_G\left(\frac{y - y_{grid}(N)}{\Delta y_{grid}}\right) \end{bmatrix}$$

$$\Phi''_y = \frac{1}{\Delta y_{grid}^2} \begin{bmatrix} \phi''_G\left(\frac{y - y_{grid}(1)}{\Delta y_{grid}}\right) \\ \vdots \\ \phi''_G\left(\frac{y - y_{grid}(N)}{\Delta y_{grid}}\right) \end{bmatrix}$$

The 1D Gaussian kernel and its first and second derivatives are:

$$\phi_G(w) = \exp\left(-\frac{1}{2}\left(\frac{w}{\sigma}\right)^2\right)$$

$$\phi'_G(w) = -\frac{w}{\sigma^2}\exp\left(-\frac{1}{2}\left(\frac{w}{\sigma}\right)^2\right)$$

$$\phi''_G(w) = \frac{w^2 - \sigma^2}{\sigma^4}\exp\left(-\frac{1}{2}\left(\frac{w}{\sigma}\right)^2\right)$$

where the width of the Gaussian kernel is set by $\sigma = \frac{1}{2}$. The partial derivatives of the jitter functions and the height function and its gradient are:

$$\frac{\partial j_x}{\partial \theta} = \Phi_j^T \frac{\partial \theta_x}{\partial \theta}$$

$$\frac{\partial j_y}{\partial \theta} = \Phi_j^T \frac{\partial \theta_y}{\partial \theta}$$

$$\frac{\partial h}{\partial \theta} = H_x \frac{\partial j_x}{\partial \theta} + H_y \frac{\partial j_y}{\partial \theta} + (\Phi_y \otimes \Phi_x)^T \frac{\partial \theta_h}{\partial \theta}$$

$$\frac{\partial H_x}{\partial \theta} = H_{xx} \frac{\partial j_x}{\partial \theta} + H_{xy} \frac{\partial j_y}{\partial \theta} + (\Phi_y \otimes \Phi'_x)^T \frac{\partial \theta_h}{\partial \theta}$$

$$\frac{\partial H_y}{\partial \theta} = H_{xy} \frac{\partial j_x}{\partial \theta} + H_{yy} \frac{\partial j_y}{\partial \theta} + (\Phi'_y \otimes \Phi_x)^T \frac{\partial \theta_h}{\partial \theta}$$

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of estimating and compensating jitter for a lidar, the method comprising:
   acquiring, with the lidar, lidar data representing a scene;
   initializing a state vector representing (i) the jitter and (ii) a height of a surface of the scene based on the lidar data;

initializing a component probability vector representing a probability that any data point in the lidar data is signal or noise;

until reaching a stopping criterion, iteratively (i) estimating a membership vector of each data point in the lidar data based on the state vector and the component probability vector and (ii) reducing a cost function based on the jitter and the height in the state vector and the membership vector of each data point in the lidar data; and after reaching the stopping criterion, forming a jitter-compensated representation of the scene based on the lidar data and the jitter in the state vector.

2. The method of claim 1, wherein acquiring the lidar data with the lidar comprises:

illuminating the scene with pulses of light from a satellite; and receiving returns from the scene with a receiver on the satellite.

3. The method of claim 1, wherein the lidar has a Ground Sampling Distance (GSD) about equal to or smaller than a Ground Resolved Distance (GRD), wherein the GSD is a distance on the ground corresponding to a distance between centers of adjacent pixels in the jitter-compensated representation and the GRD is a size of a smallest object that can be resolved in the jitter-compensated representation.

4. The method of claim 1, wherein the jitter is a two-dimensional angular jitter represented by independent Gaussian random vectors.

5. The method of claim 1, wherein initializing the state vector comprises:

forming a height image based on the lidar data without jitter compensation; and fitting a weighted sum of kernel functions to the height image.

6. The method of claim 1, wherein the stopping criterion comprises at least one of a change in the state vector, a change in the component probability vector, a change in total likelihood of the lidar data, a number of iterations, or an elapsed processing time.

7. The method of claim 1, wherein the membership vector of a given data point in the lidar data represents probabilities that the given data point of the lidar data is signal or noise.

8. The method of claim 1, wherein reducing the cost function comprises performing a gradient descent on the cost function weighted by the membership vector.

9. The method of claim 1, wherein forming the jitter-compensated representation of the scene comprises forming a diffraction-limited image of the scene based on the lidar data.

10. A system for estimating and compensating jitter for a lidar, the system comprising:

a memory configured to store lidar data representing a scene; and a processor operably coupled to the memory and configured to:

initialize a state vector representing (i) the jitter and (ii) a height of a surface of the scene based on the lidar data;

initialize a component probability vector representing a probability that any data point in the lidar data is signal or noise;

until reaching a stopping criterion, iteratively (i) estimate a membership vector of each data point in the lidar data based on the state vector and the component probability vector and (ii) reduce a cost function based on the jitter and the height in the state vector and the membership vector of each data point in the lidar data; and after reaching the stopping criterion, form a jitter-compensated representation of the scene based on the lidar data and the jitter in the state vector.

11. The system of claim 10, wherein the lidar is disposed on a satellite and configured to acquire the lidar data by illuminating the scene with pulses of light and by receiving returns from the scene with a receiver on the satellite.

12. The system of claim 10, wherein the lidar has a Ground Sampling Distance (GSD) about equal to or smaller than a Ground Resolved Distance (GRD), wherein the GSD is a distance on the ground corresponding to a distance between centers of adjacent pixels in the jitter-compensated representation and the GRD is a size of a smallest object that can be resolved in the jitter-compensated representation.

13. The system of claim 10, wherein the jitter is a two-dimensional angular jitter represented by independent Gaussian random vectors.

14. The system of claim 10, wherein the processor is configured to initialize the state vector by:

forming a height image based on the lidar data without jitter compensation; and fitting a weighted sum of kernel functions to the height image.

15. The system of claim 10, wherein the stopping criterion comprises at least one of a change in the state vector, a change in the component probability vector, a change in total likelihood of the lidar data, a number of iterations, or an elapsed processing time.

16. The system of claim 10, wherein the membership vector of a given data point in the lidar data represents probabilities that the given data point of the lidar data is signal or noise.

17. The system of claim 10, wherein the processor is configured to reduce the cost function by performing a gradient descent on the cost function weighted by the membership vector.

18. The system of claim 10, wherein the processor is configured to form the jitter-compensated representation of the scene as a diffraction-limited image of the scene.

19. A method of estimating and compensating two-dimensional (2D) angular jitter for a lidar, the method comprising:

acquiring, with the lidar mounted on a satellite, lidar data representing a scene, the lidar data having a Ground Sampling Distance (GSD) about equal to or smaller than a Ground Resolved Distance (GRD);

initializing a state vector representing (i) the 2D angular jitter and (ii) a height of a surface of the scene based on the lidar data;

initializing a component probability vector representing a probability that any data point in the lidar data is signal or noise;

until reaching a stopping criterion, iteratively (i) estimating a membership vector of each data point in the lidar data based on the state vector and the component probability vector and (ii) reducing a cost function based on the 2D angular jitter and the height in the state vector and the membership vector of each data point in the lidar data; and after reaching the stopping criterion, forming a diffraction-limited image of the scene based on the lidar data and the 2D angular jitter in the state vector, wherein the GSD is a distance on the ground corresponding to a distance between centers of adjacent pixels in the diffraction-limited image and the GRD is a size of a smallest object that can be resolved in the diffraction-limited image.

20. The method of claim 1, wherein the jitter is angular jitter.

* * * * *